US007790085B2

(12) United States Patent  
Yamaguchi et al.

(10) Patent No.: US 7,790,085 B2
(45) Date of Patent: Sep. 7, 2010

(54) LONG MOLDING MANUFACTURING METHOD AND APPARATUS

(75) Inventors: Takayuki Yamaguchi, Aichi (JP); Katsura Sugiura, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 1452 days.

(21) Appl. No.: 10/812,070

(22) Filed: Mar. 30, 2004

(65) Prior Publication Data

US 2004/0245665 A1 Dec. 9, 2004

(30) Foreign Application Priority Data

| Mar. 31, 2003 | (JP) | ............................ P.2003-095217 |
| Apr. 9, 2003 | (JP) | ............................ P.2003-105804 |
| Apr. 25, 2003 | (JP) | ............................ P.2003-121612 |

(51) Int. Cl.
*B28B 3/20* (2006.01)

(52) U.S. Cl. ..................................................... 264/295

(58) Field of Classification Search .................. 264/295
See application file for complete search history.

(56) References Cited

U.S. PATENT DOCUMENTS 4,982,486 A * 1/1991 Otagawa et al. ............ 29/527.4

6,260,395 B1 * 7/2001 Webster ......................... 72/149
6,739,599 B1 * 5/2004 Uchimura et al. ............ 277/628
2002/0162619 A1 * 11/2002 Shibuya et al. .............. 156/108

FOREIGN PATENT DOCUMENTS

JP     A 2002-347533     12/2002

OTHER PUBLICATIONS

Co-pending U.S. Appl. No. 10/754,690, filed Jan. 12, 2004.

* cited by examiner

*Primary Examiner*—Steven P Griffin
*Assistant Examiner*—Russell J Kemmerle, III
(74) *Attorney, Agent, or Firm*—Oliff & Berridge, PLC

(57) ABSTRACT

A method for manufacturing a long molding having an axial bend, includes: forming a long first member; performing an axial bending process for the first member, when the first member passes through a gripping portion; and extruding a heated and molten liquid resin molding material for formation of a second member through a second member molding opening of a second member extrusion die while following a bend of the first member to integrate the second member made of the molding material with the first member. The second member extrusion die has a changeable substantial opening shape of the second member molding opening. The second member having a different cross sectional shape between one part and the other part in the longitudinal direction is extruded in accordance with a change of the opening shape.

22 Claims, 11 Drawing Sheets

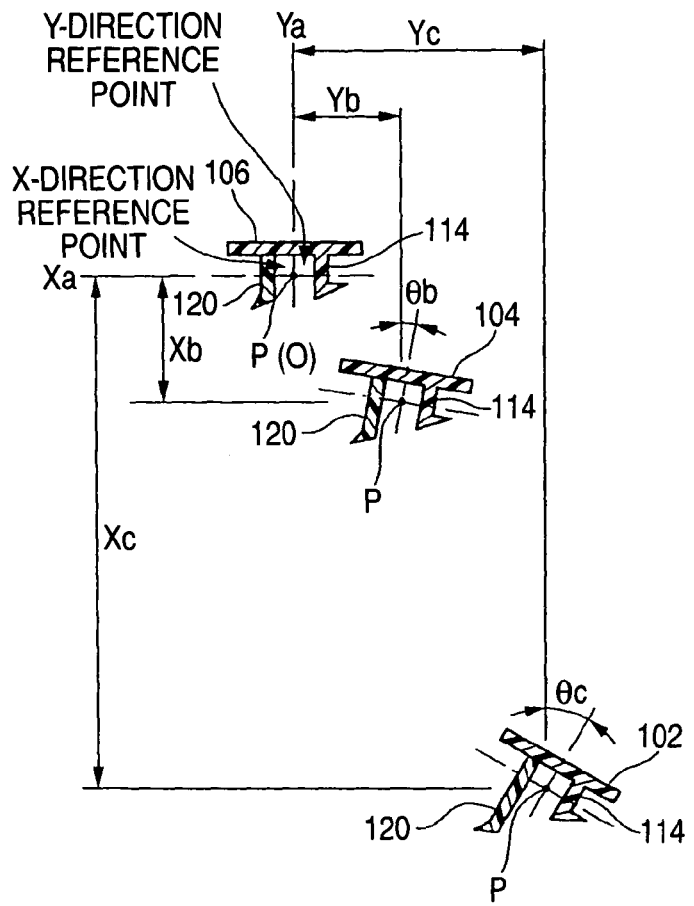
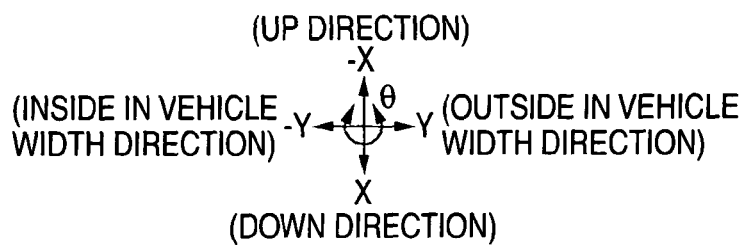
FIG. 5
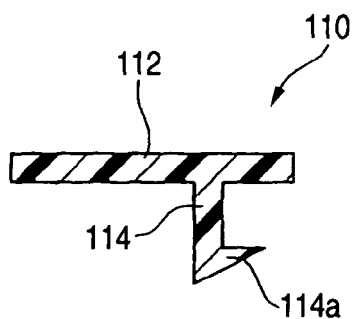

LONG MOLDING MANUFACTURING METHOD AND APPARATUS

BACKGROUND OF THE INVENTION

1. Field of the Invention

The present invention relates to a method and apparatus for manufacturing a long molding having at least one of an axial bend and an axial twist along a longitudinal direction in which a long second member is integrated with a long first member. The method and apparatus of the invention are preferably applied to the long molding in which the second member made of a resin molding material is integrated overhanging (projecting) from the first member. Also, the method and apparatus of the invention are preferably applied to the long molding in which the cross sectional shape of the second member (e.g., extent of overhang from the first member) is different between one part and the other part in the longitudinal direction.

2. Background Art

Long moldings are well known in which the long second member is integrated with the long first member. Some of the long moldings have one of the axial line bent at a predetermined radius of curvature and the axial line twisted at least in one part in the longitudinal direction. Examples of the long molding having the at least one of bend and twist (hereinafter generically referred to as a "bend") include a long trim member attached along the body edge of the vehicle, and fittings attached along the edge of a building having a curved surface structure.

One example of the trim member is a pillar and roof molding (hereinafter simply referred to as a "pillar molding") attached continuously from a front pillar portion of the vehicle to a roof portion along a bend on a corner portion between the pillar portion and the roof portion, in which the axial line is bent like the "L" character in an attached state, as seen from the lateral face of the vehicle. The axial line of this pillar molding is typically formed in such a way that a part from the corner portion to the lower end of the pillar portion is twisted compared with the roof portion with reference to the carriage in the roof portion. This twist is required because the lateral face of the vehicle is like a spindle shape (or a beer cask), and the pillar molding is placed out of the parallel or perpendicular direction to the central axis of the spindle shape.

The pillar molding of typical shape comprises a long main portion (first member) extruded from a first molding material and having a head portion like a flat plate, and a concealing portion (second member) projecting from near one end of the head portion on the back face in a width direction in a direction crossing the width direction (usually a direction crossing at or near right angle to the width direction). Usually, the concealing portion is integrated with the main portion along the longitudinal direction by the extrusion molding combined with the main portion. When the pillar molding is attached on the vehicle and employed, the concealing portion is contact with a front window plate face of the vehicle in a part attached along a front pillar portion (a part along the pillar portion), and contact with partially a concave groove (a roof groove) formed on the roof portion to shield the roof groove in a part along the roof portion.

The projection length of the concealing portion is often different between the part along the pillar portion and the other part along the roof portion. For example, the concealing portion projects longer in the part along the pillar portion than the other part along the roof portion, the distal end being contact with a window plate surface. Thereby, the head portion of the main portion is separated away from the window plate surface to the outside of the vehicle, forming a rain water receiving groove between the head portion and the window plate surface for preventing rain water on the window plate surface from flowing across it. On the other hand, the projection length of the concealing portion is shorter in the part along the roof portion than the part along the pillar portion, the distal end of the concealing portion being contact with a roof panel to close the roof groove. A part along the corner portion located between the pillar portion and the roof portion, or its neighborhood, is a start portion of cross sectional change in which the projection length of the concealing portion is changed from the projection length of the roof portion to the projection length of the pillar portion.

Conventionally, this trim member (pillar molding, etc.) is produced in the following way. That is, first of all, the first member formation resin molding material and the second member formation resin molding material are heated and molten, and both the molding materials are extruded simultaneously (coextruded) from the resin extrusion die so that the main portion and the concealing portion may be formed from the molten resin molding material, and cut off in a predetermined length. Thereby, a linear resin extruded molding (composite molding) in which the main portion (first member) and the concealing portion (second member) are integrated along the longitudinal direction is formed. Thereafter, the linear resin extruded molding is thermoldingy bent employing a bender to give a bend shape to the linear resin extruded molding. Then, the thermoldingy bent molding is set in an anneal molding provided with a space of predetermined shape, and left away for several hours to ten and several hours under the temperature condition slightly higher than the heat distortion temperature of the molding material composing the molding material and lower than the melting temperature of the molding material, and the temperature is gradually lowered to the room temperature, after which the resin molding (trim member) is taken out of the annealer. The technique of this type was described in JP-A-2002-347533 below, for example.

In the above manufacturing method for the trim member, first of all, the long composite molding consisting of the first member and the second member integrated in the longitudinal direction is fabricated, and the bending process is performed for this composite molding. Therefore, the composite molding is subject to a compression stress or tensile stress partially in the cross section during the bending process for changing the overall shape of the composite molding, and if the stress is beyond its limit, the cross section may be distorted to unwanted shape. When the cross sectional shape is different between one part of the composite molding and the other part in the longitudinal direction (e.g. when the projection length of the concealing portion is different between one part of the pillar molding and the other part in the longitudinal direction), there is a tendency that such a situation occurs during the bending process. Particularly, in the start portion (corner portion or its neighborhood) of cross sectional change of the concealing portion, a stress is concentrated on the start portion during the bending process, possibly causing a so-called "buckling" phenomenon.

SUMMARY OF THE INVENTION

Thus, it is an object of the invention to provide a method for manufacturing a long molding having at least one of an axial bend and an axial twist in which a first member and a second member are integrated in the longitudinal direction, and having a desired cross sectional shape, irrespective of the at least one of bend and twist. Also, it is another object of the invention to provide a manufacturing apparatus for carrying out the manufacturing method.

The invention provides a method for manufacturing a long resin molding having an axial bend, including: supplying a resin molding material in heated and molten state extruded from an extrusion die to a sizing flow channel of a sizing equipment; solidifying the resin molding material within the sizing flow channel by cooling the sizing flow channel from outside to calibrate a resin molding into a predetermined cross sectional shape; extruding the resin molding of the predetermined cross sectional shape from an exhaust port of the sizing flow channel at a constant extrusion direction and a constant angle carriage and in a state capable of plastic deformation; supplying continuously the resin molding to a molding gripping portion of a bender disposed on the downstream side of an exhaust port of the sizing equipment, the gripping portion slidably gripping the resin molding; and performing an axial bending process for the resin molding when the resin molding passes through the gripping portion by disposing the gripping portion at a position so as to orient in a direction crossing the constant extrusion direction.

The invention provides A method for manufacturing a long resin molding having an axial twist, including: supplying a resin molding material in heated and molten state extruded from an extrusion die to a sizing flow channel of a sizing equipment; solidifying the resin molding material within the sizing flow channel by cooling the sizing flow channel from outside to calibrate a resin molding into a predetermined cross sectional shape; extruding the resin molding of the predetermined cross sectional shape from an exhaust port of the sizing flow channel at a constant extrusion direction and a constant angle carriage and in a state capable of plastic deformation; supplying continuously the resin molding to a molding gripping portion of a bender disposed on the downstream side of an exhaust port of the sizing equipment, the gripping portion slidably gripping the resin molding; and performing an axial twisting process for the resin molding when the resin molding passes through the gripping portion by disposing the gripping portion in a carriage different from the constant angle carriage.

The invention provides an apparatus for manufacturing a long resin molding having at least one of an axial bend and an axial twist, including: an extrusion die having heating means for heating a resin molding material and an orifice for extruding the molding material into a predetermined cross sectional shape; a sizing equipment having a sizing flow channel, connected to the extrusion die, for cooling from the outer surface and solidifying the resin molding material in heated and molten state extruded from the die to calibrate a resin molding into a predetermined cross sectional shape, and extruding the resin molding from an exhaust port at a constant extrusion direction and a constant angle carriage, and a cooling unit for cooling the sizing flow channel; a bender having a gripping portion, which is disposed on the downstream side of the sizing equipment, for slidably gripping the resin molding supplied continuously from the sizing equipment; and a driving mechanism connected to the gripping portion; wherein the driving mechanism is capable of changing at least one of an orientation and an angle carriage of the gripping portion so as to be different than the constant extrusion direction and the constant angle carriage.

The invention provides a method for manufacturing a long molding having an axial bend along a longitudinal direction, including: forming a long first member prone to plastic deformation continuously in the longitudinal direction, by employing a first member molding unit, the long first member having a predetermined cross sectional shape, and having a constant radius of curvature and a constant angle carriage on the axial line in the longitudinal direction; performing an axial bending process for the first member, when the first member passes through a first member gripping portion, in which the first member is supplied continuously to the first member gripping portion of a bender disposed on the downstream side of the first member molding unit, and slidably gripped by the gripping portion, and the gripping portion is disposed at a position in a direction crossing a supply direction of the first member; causing the first member passing through the gripping portion to pass through an extrusion die provided near the gripping portion and at a position corresponding to an axial position passing through the gripping portion; and extruding a heated and molten liquid resin molding material for formation of a second member through an orifice of the extrusion die while following a bend of the first member to integrate the second member made of the molding material and having a predetermined cross sectional shape with the first member.

The invention provide a method for manufacturing a long molding having an axial twist along a longitudinal direction, including: forming a long first member prone to plastic deformation continuously in the longitudinal direction, by employing a first member molding unit, the long first member having a predetermined cross sectional shape, and having a constant radius of curvature and a constant angle carriage on the axial line in the longitudinal direction; performing an axial twisting process for the first member, when the first member passes through a first member gripping portion, in which the first member is supplied continuously to the first member gripping portion of a bender disposed on the downstream side of the first member molding unit, and slidably gripped by the gripping portion, and the gripping portion is disposed at a carriage different from the constant angle carriage; causing the first member passing through the gripping portion to pass through an extrusion die provided near the gripping portion and at a carriage corresponding to an angle carriage of the first member passing through the gripping portion; and extruding a heated and molten liquid resin molding material for formation of a second member through an orifice of the extrusion die while following a twist of the first member to integrate the second member made of the molding material and having a predetermined cross sectional shape with the first member.

The invention provides an apparatus for manufacturing a long molding having at least one of an axial bend and an axial twist along a longitudinal direction, including: a first member molding unit for forming a long first member prone to plastic deformation continuously in the longitudinal direction, the long first member having a predetermined cross sectional shape, and having a constant radius of curvature and a constant angle carriage on the axial line in the longitudinal direction; a bender having a gripping portion, which is disposed on the downstream side of the first member molding unit, for slidably gripping the first member supplied continuously from the first member molding unit, and a movement mechanism for moving at least one of an orientation and an angle carriage of the gripping portion so as to be different than the constant extrusion direction and the constant angle carriage; and an extrusion die having an insertion hole into which the first member is inserted and an orifice through which a second member having a predetermined cross sectional shape is extruded from a liquid resin molding material for formation of the second member in heated and molten state, the extrusion die being disposed near the gripping portion to cooperate with the arrangement of the gripping portion.

The invention provides a method for manufacturing a long molding having an axial bend along a longitudinal direction, including: forming a long first member prone to plastic deformation continuously in the longitudinal direction, by employing a first member molding unit, the long first member having a predetermined cross sectional shape, and having a constant radius of curvature and a constant angle carriage on the axial line in the longitudinal direction; performing an axial bending process for the first member, when the first member passes through a gripping portion, in which the first member is supplied continuously to the gripping portion of a bender disposed on the downstream side of the first member molding unit, and slidably gripped by the gripping portion, and the gripping portion is disposed at a position in a direction crossing a supply direction of the first member; causing the first member passing through the gripping portion to pass through a second member extrusion die provided near the gripping portion and at a position corresponding to an axial position of the first member passing through the gripping portion; and extruding a heated and molten liquid resin molding material for formation of a second member through a second member molding opening of the second member extrusion die while following a bend of the first member to integrate the second member made of the molding material with the first member; wherein the second member extrusion die has a changeable substantial opening shape of the second member molding opening; and the second member having a different cross sectional shape between one part and the other part in the longitudinal direction is extruded in accordance with a change of the opening shape by changing the opening shape at a predetermined timing in extruding the second member.

The invention provide a method for manufacturing a long molding having an axial twist along a longitudinal direction, including: forming a long first member prone to plastic deformation continuously in the longitudinal direction, by employing a first member molding unit, the long first member having a predetermined cross sectional shape, and having a constant radius of curvature and a constant angle carriage on the axial line in the longitudinal direction; performing an axial twisting process for the first member, when the first member passes through a gripping portion, in which the first member is supplied continuously to the gripping portion of a bender disposed on the downstream side of the first member molding unit, and slidably gripped by the gripping portion, and the gripping portion is disposed at a carriage different from the constant angle carriage; causing the first member passing through the gripping portion to pass through a second member extrusion die provided near the gripping portion and at a carriage corresponding to an angle carriage of the first member passing through the gripping portion; and extruding a heated and molten liquid resin molding material for formation of a second member through a second member molding opening of the second member extrusion die while following a twist of the first member to integrate the second member made of the molding material with the first member; wherein the second member extrusion die has a changeable substantial opening shape of the second member molding opening; and the second member having a different cross sectional shape between one part and the other part in the longitudinal direction is extruded in accordance with a change of the opening shape by changing the opening shape at a predetermined timing in extruding the second member.

The invention provide an apparatus for manufacturing a long molding having at least one of an axial bend and an axial twist along a longitudinal direction, including: a first member molding unit for forming a long first member prone to plastic deformation continuously in the longitudinal direction, the long first member having a predetermined cross sectional shape, and having a constant radius of curvature and a constant angle carriage on the axial line in the longitudinal direction; a bender having a gripping portion, which is disposed on the downstream side of the first member molding unit, for slidably gripping the first member supplied continuously from the first member molding unit, and a movement mechanism for moving at least one of an orientation and an angle carriage of the gripping portion so as to be different than the constant extrusion direction and the constant angle carriage; and a second member extrusion die having an insertion hole into which the first member is inserted and a second member molding opening through which a second member is extruded from a liquid resin molding material for formation of the second member in heated and molten state, the second member extrusion die being disposed near the gripping portion to cooperate with the arrangement of the gripping portion; wherein the second member extrusion die is provided with opening shape changing means for changing a substantial opening shape of the second member molding opening at a predetermined timing.

Preferably, as the means for changing the substantial opening shape of the second member molding opening, there are (1) a method for changing substantially the opening shape by disposing a movable shutter at the exit of an extrusion opening (orifice) of definite shape, and moving the shutter in the course of extrusion molding ("shutter method"), and (2) a method for changing substantially the opening shape by disposing a movable cutter at the exit of an extrusion opening (orifice) of definite shape, and moving the cutter in the course of extrusion molding, in which the opening shape is decided by a part of the opening and the cutter and substantially changed to cut off a part of extruded material continuously ("cutter method").

In the shutter method, it is preferable to control the increase or decrease of the supply amount of material to be supplied to the opening in accordance with an increase or decrease in the opening area. In the cutter method, it is not always necessary to control the increase or decrease of the supply amount of material.

In the manufacturing method according to the invention, after or while at least one of the bending process and twisting process is firstly performed for the first member, the second member is molded along (following) the at least one of the bend and twist shapes of the first member by extruding the second member formation resin molding material through the second member molding opening of the second member extrusion die that is disposed corresponding to at least one of the position of the first member and the angle carriage of the first member. In this way, the second member is extruded along the longitudinal direction of the first member after or during at least one of the bending process and the twisting process, and integrated with the first member, thereby producing the composite molding. This second member is extruded by changing the opening shape so that the cross sectional shape is different between one part and the other part in the longitudinal direction. Since the cross sectional shape of the second member is controlled during extrusion in this way, the manufacturing efficiency is enhanced as compared with the manufacturing method for removing (cutting off) the unwanted part after extrusion into the constant cross sectional shape, for example. Also, since the second member formation resin molding material is extruded in heated and molten state from the second member molding opening, the second member is formed in the manner of following at least one of the bend shape and the twist shape of the first member. Therefore, even when the cross sectional shape of the second member is different between one part and the other part in the longitudinal direction, an unintentional change (distortion) in the shape (e.g., cross sectional shape) is less likely to occur as compared with the bending and twisting process for the linear composite molding in which the first member and the second member is already integrated. For example, the "buckling" phenomenon is effectively prevented from occurring. Accordingly, the long molding (object) having highly precise cross sectional shape is produced. Also, the second member is easily integrated (combined) with the first member.

With this manufacturing method according to the invention, at least one of the bending process and twisting process for the first member is performed by inserting the first member supplied continuously from the first member molding unit through the gripping portion, which is displaced from the reference position (carriage) to the position (sense) at which the first member is fed out in the direction off the supply direction (position at which the exit of the gripping portion on the downstream side is faced in at least one of the direction crossing the supply direction) and the carriage different from the angle carriage at the supply time (carriage at which the cross sectional shape of the first member is rotated by a predetermined angle around the axial line). The extent of bending and twisting (e.g., radius of curvature, intensity of twist) is adjusted or controlled in accordance with the arrangement of the gripping portion (position (sense) and carriage). Accordingly, various long moldings of different shapes can be easily manufactured by integrating the second member with the first member. According to the invention, one or more effects are obtained.

In this specification, the term "resin" as used in the terms "resin molding material" and "resin molding" is the concept including the so-called elastomer material, such as olefin and other thermoplastic elastomer (TPE). Also, in this specification, the term "radius of curvature" includes the infinite radius. Accordingly, the first member as used in the phrase "first member with a constant radius of curvature" includes the linear first member.

BRIEF DESCRIPTION OF THE DRAWINGS

The present invention may be more readily described with reference to the accompanying drawings:

FIG. 4A is a cross-sectional view taken along the line (a)-(a) in FIG. 2, FIG. 4B is a cross-sectional view taken along the line (b)-(b) in FIG. 2, and FIG. 4C is a cross-sectional view taken along the line (c)-(c) in FIG. 2.

FIG. 5 is a cross-sectional view, taken along the line V-V in FIG. 10, showing the cross sectional shape of a base molding for the long molding according to one embodiment.

DETAILED DESCRIPTION OF THE PREFERRED EMBODIMENTS

Figure 1:
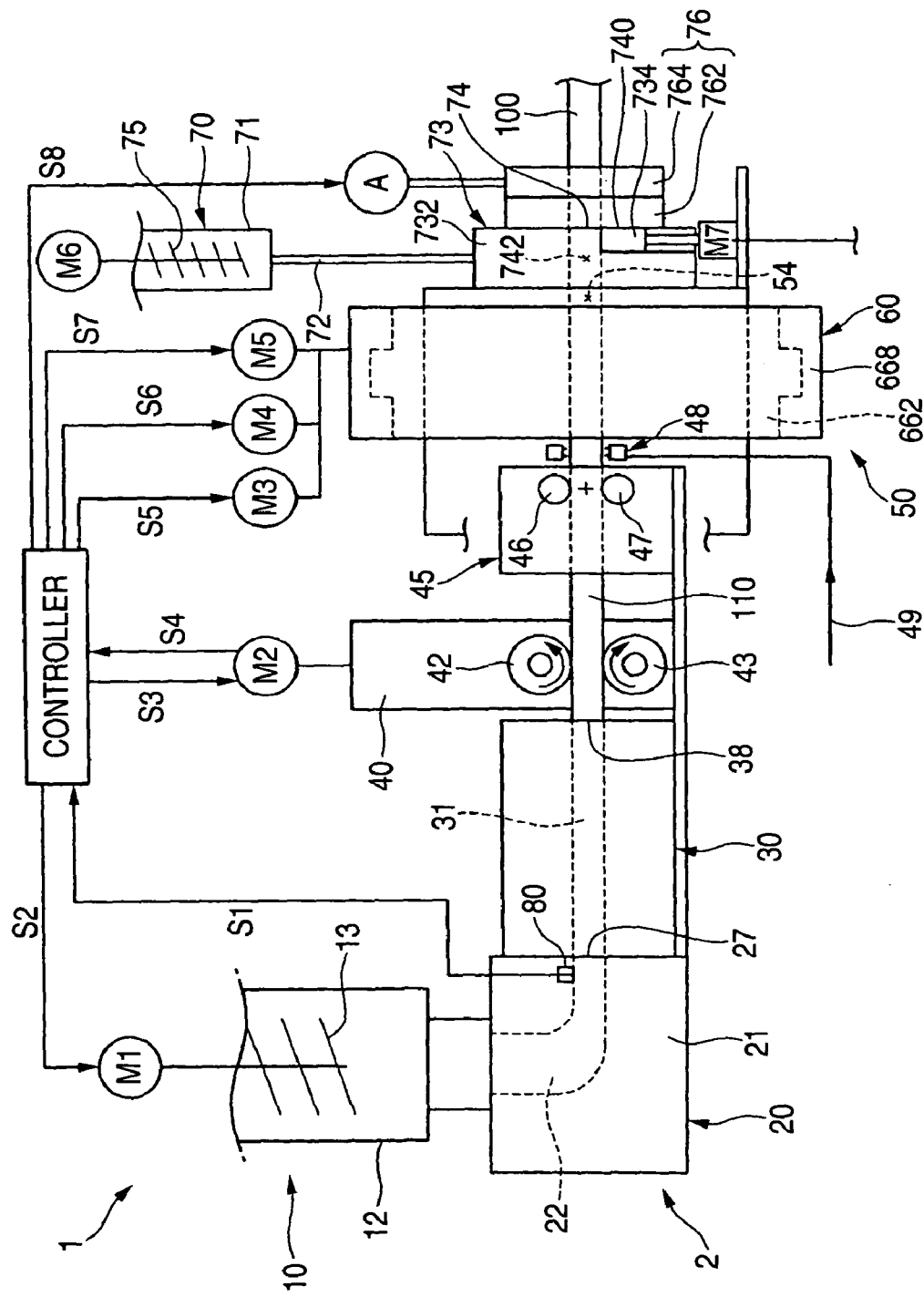
FIG. 1 is a schematic explanatory diagram showing one example of a long molding manufacturing apparatus for practicing a manufacturing method of the present invention.

The preferred embodiments of the present invention will be described below. In this specification, the items required to carry out the invention other than those specifically referred to (e.g., the general items concerning the extrusion molding such as an operation method of the extrusion machine) may be grasped as the design items made by those skilled in the art based on the conventional techniques. This invention may be practiced based on the matter as disclosed in this specification and drawings and the technical common sense in the relevant field.

The long moldings produced by a manufacturing method of the invention have at least one of an axial bend and an axial twist, and comprise a first member, and a second member integrated with the first member along a longitudinal direction of the first member and having a different cross sectional shape between one part and the other part in the longitudinal direction. There is specifically no limitation on the presence or absence of other elements (annexed parts). An area ratio of the first member to the second member occupied in the cross sectional face of each part in the longitudinal direction of the long moldings (volume ratio occupied in the long molding), the number of the first members and the number of the second members, and their arrangement, are not specifically limited. For example, the invention is preferably applied for the manufacture of the long moldings in which one or more second members are integrated with a single (continuous)) first member along the longitudinal direction. Also, it is preferable that the invention is applied for the manufacture of the long moldings in which the second member is integrated to overhang outwards from the outer face of the first member, whereby the application effects (e.g., the effects of producing the moldings of desired cross sectional shape) are excellently exhibited.

In a typical example of the long molding according to the invention, each of the first member and the second member is made of a resin molding material. The used resin molding materials are preferably composed of a thermoplastic resin as a matrix, in which other components are not specifically limited. In this specification, the term "thermoplastic resin" covers a synthetic resin indicating thermoplastic property, rubber and elastomer.

The used thermoplastic resin may be general-purpose resin or engineering resin, crystalline resin or amorphous resin. For example, there are polypropylene (PP), acrylonitrile-butadiene-styrene copolymer (ABS), acrylonitrile-ethylene-propylene-rubber-styrene copolymer (AES), polyamide (PA), polycarbonate (PC), polyacetal (POM), polyethylene (PE), polystyrene (PS), polyphenylene oxide (PPO), and polymethyl-metacrylate (PMMA). Besides, polyvinylchloride (PVC), polyethylene-terephthalate (PET) and polybutylene-terephthalate (PBT) at various grades may be employed.

To take care of the environments, the resins containing no halogen such as chloride are preferred, and from the point of view of recycling, olefinic resins such as polyethylene and polypropylene are particularly preferred.

Besides, various kinds of thermoplastic elastomers (e.g., olefin, styrene, and vinyl based) may be suitably employed. Particularly, from the point of view of recycling, olefinic thermoplastic elastomer (TPO) in which the hard segment is olefinic resin is preferable.

In practicing the invention, the molding material may contain one kind of thermoplastic resin as exemplified as a matrix component, or may contain polymer complex or polymer alloy composed of two or more kinds of thermoplastic resins as the matrix components.

Also, the molding material may contain various sub-components. Suitable examples of such sub-components include at least one of powder-like solid fillers and fibrous solid fillers. This kind of solid fillers may be employed without special limitations, as far as they have stable property of material (typically fillers as conventionally used). For example, this kind of solid fillers may be ceramic powder (containing various kinds of inorganic compound powder such as talc, the same in the following), carbon powder, wood flour, ceramic fiber, or carbon fiber. Or it may be fibrous organic powder composed of metal powder such as iron powder or plant powdery (e.g., cotton). Preferred ceramic powder may be particulate matter (typical particle diameter from 1 to 1000 μm) of oxide, silicate or carbonate. Examples of silicate include talc, clay, mica, glass beads, and talc is particularly preferable from the point of view of improving the strength. Examples of oxide include silica, alumina, titanium oxide, zinc oxide, magnesium oxide, and pumice. Examples of carbonate include calcium carbonate and magnesium carbonate. Also, preferred examples of ceramic fiber include glass fiber, boron fiber and silicon carbide fiber having a diameter of about 0.1 to 500 μm, and glass fiber is particularly preferable.

In preparing the molding material, the content amount (ratio) of the solid filler depends on the kind of filler employed and the usage of extrusion moldings finally produced. With the manufacturing method of the invention, the first member (resin molding) with smooth surface is manufactured, even if the content amount of solid filler in the resin molding material employed to form the first member is 30 mass % or more (e.g., 30 to 50 mass %), or 40 mass % or more (e.g., 40 to 60 mass %), for example. Of course, even when the molding material has the content ratio of solid filler below the above range, the resin molding with smooth surface is manufactured.

Also, the molding material may contain various auxiliary components, in addition to the solid filler. Examples of such auxiliary component may include antioxidant, light stabilizer, UV-absorber, plasticizer, lubricant, colorant, and flame retardant.

Such molding materials may be prepared in desired form by conventionally well known methods. For example, thermoplastic resin and granular filler are blended at a predetermined ratio, kneaded and extruded into strand in a kneader/extruder, and shaped as pellet.

The resin molding material (first member molding material) forming the first member and the resin molding material (second member molding material) forming the second member may or may not have the same composition. In a preferred example, the first member is formed of a resin molding material containing relatively hard thermoplastic elastomer (e.g., TPO in which the hard segment is olefinic resin such as polypropylene as the main substance (matrix). Thereby, the at least one of the bending process and the twisting process of the first member is excellently performed. Also, the first member being bent or twisted is easily inserted into the extrusion die. The second member is formed of the resin molding material containing relatively hard thermoplastic elastomer as the main substance, like the first member. Also, the second member may be formed of a resin molding material containing thermoplastic elastomer softer than the first member (e.g., TPO in which the hard segment is olefinic resin such as polypropylene and the soft segment is ethylene-propylene-diene copolymer) as the main substance. Alternatively, the second material may be formed of a resin molding material harder than the first member.

Also, this invention is preferably applied to the manufacture of the long moldings consisting of the first member formed of a metallic material such as steel or stainless steel and the second member formed of the resin molding material, which are integrated together. The metallic material composing the first member may be appropriately chosen, depending on the usage of long moldings. Also, the resin molding material composing the second member may be any of resin molding materials as above cited, like the first member made of resin.

Embodiment 1

Figure 2:
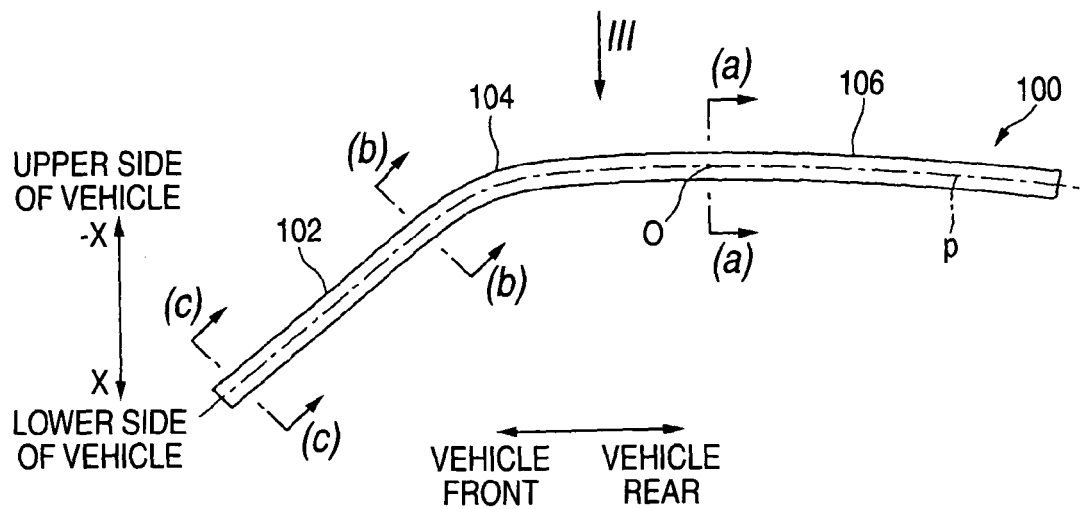
FIG. 2 is a front view showing the overall shape of a long molding according to one embodiment of the invention.
Figure 3:
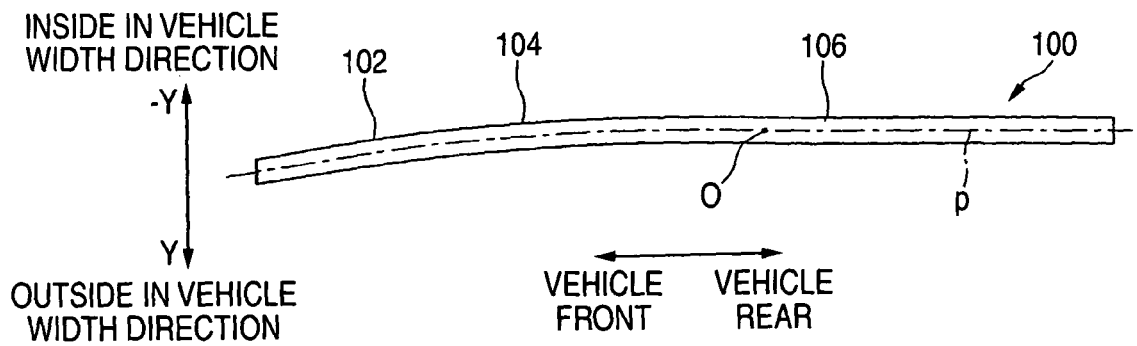
FIG. 3 is a perspective view of the long molding as seen from the III direction in FIG. 2.
Figure 6:
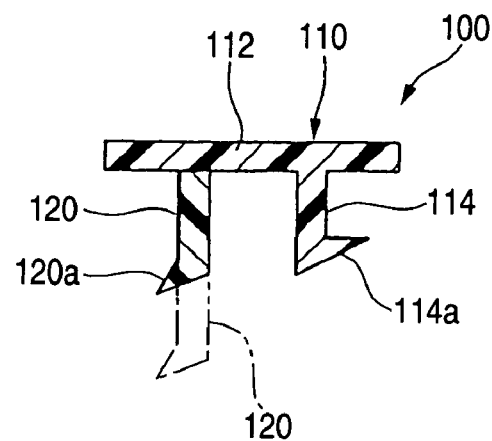
FIG. 6 is a cross-sectional view, taken along the line VI-VI in FIG. 10, showing the cross sectional shape of the long molding according to one embodiment.

A method for manufacturing the long moldings according to a suitable embodiment of the invention will be described below in detail with reference to the accompanying drawings. In this embodiment, a long resin molding 100 (roof molding for vehicle for use to be mounted on the left side of the vehicle) having a cross sectional shape as shown in FIG. 6 and molded in the overall shape as shown in FIGS. 2 and 3 is manufactured. This long molding 100 is the roof molding corresponding to the pillar molding, and mounted continuously from a front pillar portion on the left side of the vehicle to a roof portion along a bend of the corner portion between the pillar portion and the roof portion.

As shown in FIG. 6, this molding 100 is constituted of a resin molding 110 (hereinafter referred to as a "base molding" 110) and a concealing portion 120, and molded to have a cross section on a bridge as a whole. The base molding 110 comprises a relatively wide head portion 112 like an almost flat plate and serving as the ornamental portion, and a mounting leg portion 114 projecting from near one end in a width direction on the back face (lower face in FIG. 6) of the head portion 112 in a direction almost orthogonal to the width direction. At a lower end of the leg portion 114, a convex portion 114a projecting outwards in the width direction and slightly extending toward the head portion 112 is formed to engage a clip attached on the vehicle panel. The head portion 112 and the leg portion 114 are integrally molded, as will be described later. Also, the concealing portion 120 projects from near the other end of the head portion 112 on the back face of the base molding 110 in the width direction in the direction almost orthogonal to the width direction. At a lower end of the concealing portion 120, a convex portion 120a projecting outwards in the width direction and slightly leaving away from the head portion 112 is formed to make contact with a surface of a window plate for the vehicle in the pillar portion or a bottom face of a roof groove in the roof portion. This concealing portion 120 is molded additionally (later) to the base molding 110. And the projection length of the concealing portion 120 from the base molding 110 (back face of the head portion 112) is different between one part (roof portion) of the molding 100 and the other part (pillar portion) in the longitudinal direction. In FIG. 6, the different projection length (cross sectional shape) of the concealing portion 120 in cross section at the other position (pillar portion) in the longitudinal direction is indicated by the two-dot chain line. On the other hand, the projection length (cross sectional shape) of the leg portion 114 is substantially equal in the longitudinal direction.

The base molding 110 is preferably formed of a molding material containing a relatively hard TPO (e.g., olefinic thermoplastic elastomer in which hard segment is olefinic resin such as polypropylene). The molding material composed of TPO (e.g., from 40 to 60 mass %) and the granular solid filler such as wood flour (e.g., from 60 to 40 mass %) is preferably employed. Though being not specifically limited, the granular solid filler has preferably an average particle diameter in a range from about 1 to 1000 μm. Also, the concealing portion 120 is made of a molding material having the almost same composition as the base molding 110. Alternatively, the concealing portion 120 may be formed of a relatively soft TPO (e.g., TPO in which hard segment is olefinic resin such as polypropylene and soft segment is ethylene-propylene-diene copolymer) as the main substance.

The molding 100 having the above cross sectional shape is molded in the overall shape (outer shape), as shown in FIGS. 2 and 3. FIG. 2 is a view of the molding 100 in a state where it is mounted on the vehicle as seen from the direction corresponding to the left side of the vehicle. The vertical direction (up and down direction) of FIG. 2 corresponds to the vertical direction (hereinafter referred to as "X direction") of the vehicle, and the crosswise direction (right and left direction) corresponds to the longitudinal direction of the vehicle. As illustrated, the molding 100 has a pillar counterpart 102 corresponding to a part attached along the front pillar portion, a corner counterpart 104 attached near the boundary between the front pillar portion and the roof portion, and a roof counterpart 106 corresponding to a part attached along the roof portion, which are integrally formed continuously in order from the part corresponding to the fore side of the vehicle. FIG. 3 is a view as seen from the arrow III in FIG. 2, in which the molding 100 is seen from above the vehicle. As illustrated, the pillar counterpart 102 is formed to be slightly open to the outside of the vehicle with respect to the roof counterpart 106. The vertical direction of FIG. 3 corresponds to the width direction (direction orthogonal to the X direction, hereinafter referred to as "Y direction") of the vehicle.

In the molding 100 according to this embodiment, the roof counterpart 106 has a larger radius of curvature than the corner counterpart 104, and the pillar counterpart 102 has a larger radius of curvature than the roof counterpart 106. That is, the radius of curvature is different in one part and the other part in the longitudinal direction. In FIGS. 2 and 3, the base molding 110 making up the molding 100 is of the shape having a "bend" of the axial line P as indicated by the dashed line. Also, the molding 100 has a "twist" of the axial line P. Therefore, the molding 100 has a different angle carrier of the cross sectional shape between one part and the other part in the longitudinal direction. The angle of twist (intensity of twist) of the axial line P per unit length is different between one part and the other part of the molding 100 in the longitudinal direction 100. This twist is required because the side face of the vehicle has a shape like a spindle (or a beer cask), whereby the molding 100 is disposed not to be parallel to or perpendicular to the central axis of the spindle shape.

Also, the concealing portion 120 making up the molding 100 has a different cross sectional shape (projection length) between one part of the molding 100 and the other part in the longitudinal direction. More specifically, the concealing portion 120 extends longer from the head portion 112 in the pillar counterpart 102 than the roof counterpart 106. When this molding 100 is mounted on the vehicle, not shown, a distal end of the concealing portion 120 makes contact with the surface of window plate in the pillar counterpart 102. Thereby, the head portion 112 is left away from the surface of window plate toward the outside of the vehicle, forming a rain water receiving groove between the head portion 112 and the surface of window plate to prevent rain water from flowing across the window plate. On the other hand, the projection length of the concealing portion 120 is shorter in the roof counterpart 106 than the pillar counterpart 102. In this roof counterpart 106, the distal end of the concealing portion 120 makes contact with the roof panel to close the roof groove. And the corner counterpart 104 or its neighboring part located between the pillar counterpart 102 and the roof counterpart 106 is a start portion of changing cross section in which the projection length of the concealing portion 120 is changed from the projection length in the roof portion 106 to the projection length in the pillar counterpart 102.

Referring to FIG. 4, when one part of the molding in the longitudinal direction is referenced, the position, angle carrier and cross sectional shape of the other part will be described below. FIG. 4A is a cross sectional view (i.e., cross sectional view taken along the line (a)-(a) in FIG. 2) of the molding 100 including the reference point O set at a predetermined position of the roof counterpart 106. FIG. 6 shows particularly the shape of the molding 100 in the cross section taken along the line (a)-(a). Also, FIG. 4B is a cross sectional view (cross sectional view taken along the line (b)-(b) in FIG. 2) of the molding near an end portion on the pillar side in the corner counterpart 104, and FIG. 4C is a cross sectional view (cross sectional view taken along the line (c)-(c) in FIG. 2) of the molding in the pillar counterpart 102. In FIG. 4, the cross sectional views (a), (b) and (c) are placed corresponding to the relative position and carrier (angle) of the molding 100 in the respective cross sections. The vertical direction of FIG. 4 corresponds to X direction, and the crosswise direction of FIG. 4 corresponds to the Y direction. The direction perpendicular to the page of FIG. 4 corresponds to the longitudinal direction of the vehicle. Also, reference sign θ denotes the rotational angle around the axial line P.

As will be apparent from FIGS. 2 and 4, with reference to the axial line P (reference point O) at the (a)-(a) line position ((a) in FIG. 4) of the roof counterpart 106, the axial line P is displaced by distances Xb and Yb in the X and Y directions, and rotated by angle θb in the clockwise direction as seen from the front of the vehicle (fore side of the page) at the (b)-(b) line position ((b) in FIG. 4) of the corner counterpart 104. In the cross section as shown in FIG. 4B, the length of the leg portion 114 is equal to that in the cross section as shown in FIG. 4A, but the length of the concealing portion 120 is longer than that in the cross section as shown in FIG. 4A, as will be apparent from comparison with the length of the leg portion 114. Also, with reference to the axial line P (reference point O) of FIG. 4A, the axial line P is displaced by distances Xc and Yc in the X and Y directions, and rotated by angle θc in the clockwise direction as seen from the front of the vehicle (fore side of the page) at the (c)-(c) line position ((c) in FIG. 4) of the pillar counterpart 102. In the cross section as shown in FIG. 4C, the length of the leg portion 114 is equal to those in the cross sections as shown in FIGS. 4A and 4B, but the length of the concealing portion 120 is longer than that in the cross section as shown in FIG. 4B, as will be apparent from comparison with the length of the leg portion 114. Though the length of the concealing portion 120 is different in FIGS. 4B and 4C, this length is decided by the styling of the vehicle but may be equal in some cases. The molding 100 is molded in a shape having a bend and twist of the axial line P in this way. The degree of bend and twist is different between one part of the molding 100 and the other part in the longitudinal direction. Also, the projection length (cross sectional shape) of the concealing portion 120 is different between one part of the molding 100 and the other part in the longitudinal direction. The molding on the right side of the vehicle, not shown, is symmetrical to the molding on the left side with reference to the center of the vehicle in the width direction, whereby the invention is applicable to the molding on both sides in the same way.

The molding 100 having such cross sectional shape and overall shape can be manufactured in the following way. FIG. 1 is an explanatory view schematically showing the essence of a resin molding manufacturing apparatus 1 according to this embodiment of the invention.

For the convenience, when not only the base molding (resin molding) 110 after solidification but also the molding material composing the base molding 110 are referred to, the same reference numerals as those of the base molding 110 are attached, whether in the molten state or solidified state.

As shown in FIG. 1, there are an extrusion machine 10 (herein a general single spindle extruder), an extrusion die (first extrusion molding die) 20 connected to the distal end of the extrusion machine 10, and a sizing equipment 30 on the upstream side (left side in FIG. 1). They make up a first member molding unit 2 for forming continuously the long base molding (first member) 110 subject to plastic deformation in the longitudinal direction. A pulling machine (first member supply equipment) 40 is disposed on the downstream side of the sizing equipment 30, and a bender 50 is disposed on the downstream side of the pulling machine. The bender 50 comprises an X-direction movement support member 52 having a gripping portion 54 of the molding. The gripping portion 54 can be rotated in the X direction via an X-direction drive shaft 624.

This X-direction movement support member 52 is provided in a driving mechanism (corresponding to the "movement mechanism" as above) 60. By activating this driving mechanism 60, at least one of the position and the carriage of the gripping portion 54 can be changed. Though being not requisite means for carrying out the invention, a bend supporting means 45 serving as a fulcrum of the bending and a coolant blowing means 48 are provided on the entrance side (upstream side of the gripping portion 54) of the bender 50 in this embodiment.

The above means are a unit for producing at least one of an axial bend and an axial twist by extruding the base molding (resin molding) 110 of the molding 100 having a cross sectional shape (hereinafter often referred to as a "base molding unit"), as shown in FIG. 6.

Also, a second extrusion die (second member extrusion die) 73 connected to a second extrusion machine 70 is disposed on the downstream side of the bender 50 (gripping portion 54), as shown in FIG. 1. This second extrusion die 73 is directly connected on the downstream side of the X-direction movement support member 52 having the gripping portion 54. When the gripping portion 54 changes at least one of the position and the carriage by activating the driving mechanism 60, the second extrusion die 73 is moved integrally with the gripping portion 54. The second extrusion machine 70 and the second extrusion die 73 are a unit for extrusion molding the concealing portion 120 (hereinafter referred to as a "concealing portion molding unit") on the outer side face of a pair of leg portions 114 for the base molding 110 (see FIG. 6).

A cutting-off machine 76 for cutting off the molding 100 extruded from the second extrusion die 73 into desired length is provided on the downstream side of the second extrusion die 73, as shown in FIG. 1. The manufacturing apparatus 1 of this embodiment may further comprise a cooling machine, not shown, on the downstream side of the cutting-off machine 76.

First of all, the base molding unit will be described below.

Figure 7:
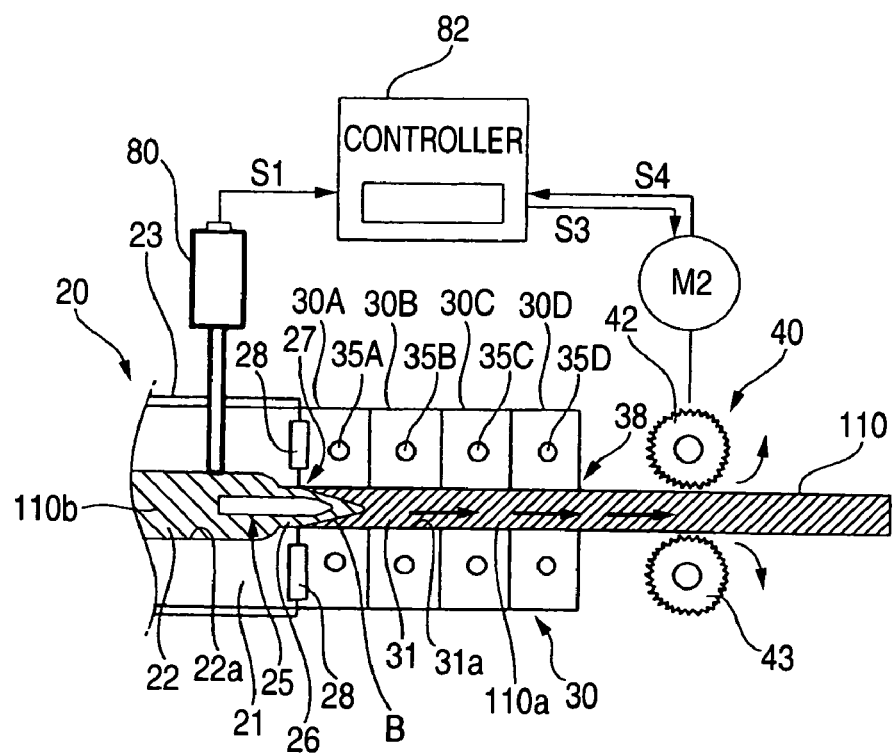
FIG. 7 is a cross-sectional view schematically showing the essence of FIG. 1.

The first extrusion machine 10 is a general single spindle extrusion machine, comprising a screw 13 for feeding the base molding material 110 in a direction of the distal end, while melting the base molding material 110 supplied in the pellet or other shape into a heating cylinder 12, as shown in FIG. 1. The die 20 is mounted at the distal end of the heating cylinder 12. A molten resin flow channel 22 communicating to the cylinder 12 is formed inside the die 20, as shown in FIG. 7. The latter half part (downstream side) of the molten resin flow channel 22 has a land portion 26 having a smoldinger inner diameter than the former half part (upstream side). An orifice 27 having a shape according to the cross sectional shape (see FIG. 5) of the base molding 110 is formed at the distal end of the land portion 26.

On the other hand, a band heater 23 for generating a heat by turning on electricity is provided around a metallic main body 21 of the die 20. Heat generated by the band heater 23 is conducted to the die main body 21 to heat the entire die 20. Also, a heat insulating portion (a non-contact space portion in this embodiment) 28 for restricting heat conduction between the die 20 and the sizing equipment 30 is provided in a connecting portion with the sizing equipment 30 (typically around the orifice 27). That is, the band heater 23 and the heat insulating portion 28 prevent heat of the die 20 from being deprived by the sizing equipment 30 connected to decrease the temperature of molten resin or increase the viscosity to solidify the resin, whereby the molten resin around the land portion 26 and the orifice 27 is kept in molten state at appropriate temperatures as desired. The surface of the sizing equipment 30 opposite the die 20 is preferably made a so-called metal bright face. In this way, radiant heat from the die 20 is reflected, thereby effectively suppressing a rise in temperature of the sizing equipment 30.

Further, a metallic heat conduction member 25 having higher heat conductivity than the molding material is disposed within the molten resin flow channel 22 and the land portion 26. The heat conduction member 25 is connected in contact with the die main portion 21 via a metallic connecting member (not shown) having excellent heat conduction. Thereby, heat passed from the band heater 23 to the die main body 21 is rapidly conducted via the connecting member to the heat conduction member 25. Moreover, the heat conduction member 25 contains an electric heater energizably contact with an external power source, not shown. It is preferable that the temperature may be simply regulated by changing the amount of electricity.

In this embodiment, the longitudinal cross sectional shape of the heat conduction member 25 is a flat shape along the longitudinal direction of the flow channel, the distal portion located on the downstream side of the flow channel being tapered, as shown in FIG. 7. This distal portion enters a sizing flow channel 31 of the sizing equipment 30 beyond the orifice 27. Also, the cross sectional shape of the heat conduction member 25 corresponds to the central portion between the head portion 112 having the cross sectional shape of the base molding 110 and the thickness of two leg portions 114, as shown in FIG. 5. This heat conduction member 25 is disposed at the position at which the molding material 110 passes around the heat conduction member 25 at the position of the orifice 27.

As shown in FIG. 7, the sizing flow channel 31 communicating to the orifice 27 is formed on the inside of the sizing equipment 30. An inner face of this sizing equipment 31 is a smooth face, preferably a specular face. The cross sectional shape of the sizing equipment 31 is almost fixed in the longitudinal direction of the flow channel, and formed to accord with the cross sectional shape (see FIG. 5) of the base molding 110. This sizing equipment 30 comprises several (four in this embodiment) cooling units 30A to 30D, each cooling unit having cooling means that is controllable independently of each other. The cooling means according to this embodiment constitute coolant passages 35A to 35D, and are provided to surround the sizing equipment 31. Each portion of the sizing equipment 30 is cooled to a desired temperature by passing coolant such as water or oil of which the temperature is adjusted to the optimal temperature through each of the coolant passages 35A to 35D. The coolant may be favorably circulated in use between a temperature regulator such as a chiller, not shown, prepared separately, and the sizing equipment 30 (coolant passages 35A to 35D). Thereby, the heat of the molding material (resin) is deprived efficiently.

The base molding material 110 supplied from the first extrusion machine 10 as shown in FIG. 1 is extruded from the orifice 27 of the die 20 heated to the melting temperature or higher of the molding material into the sizing flow channel 31 of the sizing equipment 30 in a state where the matrix (thermoplastic resin) component is molten (heated and molten state). In this case, an inner wall face 31a of the sizing flow channel 31 as shown in FIG. 7 is regulated to a temperature below the melting point of the matrix component (preferably a heat distortion temperature or below). Thereby, the molding material 110 extruded into the sizing equipment 31 of the sizing equipment 30 is cooled from the outside, and gradually solidified from a surface portion in contact with the inner wall face 31a.

On the other hand, the heat conduction member 25 is heated to the temperature higher than the melting point of the matrix component (thermoplastic resin component) for the base molding material 110 by heat conduction from the die main body 21 (by turning on electricity, as needed). Since heat is conducted from such heat conduction member 25 to the molding material 110 flowing around it, the lower temperature of the molding material 110 is prevented, whereby a molten portion inside the molding material 110 entering the sizing flow channel 31 can be kept up to the area beyond the distal end of the heat conduction member 25. The boundary line B as shown in FIG. 7 typically shows the boundary between a solidified portion 110a of the base molding material 110 flowing through the sizing flow channel 31 and a molten portion 110b. In this way, since the molten portion 110b remains inside the molding material 110 for a while after entering the sizing flow channel 31, the solidified surface of the molding material 110 is pressed against the smooth inner wall face 31a of the sizing flow channel 31 owing to a pressing force (expansion pressure) from the first extrusion machine exerted on the liquid molten portion 110b, thereby transferring the smooth inner wall face onto the surface of the molding material 110 to make the surface smooth, and the expansion pressure is applied as a force in the extrusion direction. The smooth inner wall face 31a has an advantage of preventing to increase the sliding resistance of the molding material 110 in contact with the inner wall face and moving in the extrusion direction.

In this way, the molding material 110 supplied to the sizing flow channel 31 is cooled within the sizing flow channel 31 from the outside and solidified, pressed against the inner wall face 31a of the sizing flow channel 31, and calibrated into a predetermined cross sectional shape (corresponding to the cross sectional shape of the sizing flow channel 31). And the molding material 110 (resin molding 110) calibrated in the predetermined cross sectional shape is extruded from an exhaust port 38 at the end of the sizing flow channel 31. This extrusion is performed in a constant extrusion direction and a constant angle carriage corresponding to the shape and the sense of the sizing flow channel 31. The resin molding 110 extruded from the exhaust port 38 can be subject to plastic deformation owing to an outside force, at least its outer surface portion being solidified (preferably at the temperature below the heat distortion temperature). It is preferable that the outer surface portion of the resin molding 110 is below the heat distortion temperature, and the inner portion is above the heat distortion temperature (more preferably above the heat distortion temperature and below the melting temperature). For example, the temperatures of at least one of the cooling means 35A to 35D and the heat conduction member 25 are appropriately controlled to implement the extrusion in the state at such temperatures.

In this way, the resin molding 110 extruded continuously from the exhaust port 38 of the sizing flow channel 31 is introduced into the pulling machine 40 provided at a downstream position of the exhaust port 38, as shown in FIGS. 1 and 7. This pulling machine 40 applies a force in the extrusion direction to the molding 110, and applies a supply force to the bender. That is, the pulling machine 40 pulls the resin molding 110 out of the sizing equipment 30, and applies a pushing force to the bender. As shown in FIGS. 1 and 7, the pulling machine 40 according to this embodiment comprises a pair of rollers 42 and 43 rotated and driven by a drive source (typically a motor M2 with controllable rotating speed). The pair of rollers 42 and 43 are disposed on the upper and lower sides of the extension line in the extrusion direction from the exhaust port 38 of the resin molding 110. Accordingly, the resin molding 110 extruded from the exhaust port 38 passes between the pair of rollers 42 and 43 in the extrusion direction as it is. If the pair of rollers 42 and 43 are rotated in the directions as shown in FIGS. 1 and 7, a force in the same direction as the extrusion direction from the exhaust port 38 is applied on the resin molding 110. Owing to this force, the resin molding 110 is pulled out of the sizing equipment 30 at a speed according to their rotating speed (in cooperation with the rotations of the rollers 42 and 43) in a state where it is pressed against the pair of rollers 42 and 43 and carried between them. This force also acts as a pushing force for pushing the resin molding 110 into the gripping portion 54 of the bender 50 on the downstream side by feeding it from the pulling machine 40. By providing this pulling machine 40, the resin molding 110 can be extruded from the exhaust port 38 stably, even if there is a large friction within the sizing equipment 30. Also, the pressure of molten material within the flow channels 22 and 26 is kept constant by controlling the rotating speed (pulling speed) of the rollers 42 and 43.

The pair of rollers 42 and 43 are required to grip the resin molding 110 and regulate its moving speed without causing slip, in which there are no specific limitations on the surface shape or material. For example, if the rollers (e.g., made of steel) are formed with irregularities on the outer circumferential face by knurling, the knurled face bites into the surface of the resin molding to be driven for rotation, so that the pulling force (pushing force to the gripping portion) can be securely applied to the resin molding 110 without causing slip between the rollers and the resin molding 110. Also, when the damaged surface of the resin molding 110 is not accepted at the positions of the rollers 42 and 43, the rollers made of rubber should be employed to prevent unfavorable trace from being formed on the surface of the molding pinched between the rollers. Alternatively, a rubber belt or crawler (caterpillar) may be employed, instead of the cylindrical roller. Not only one pair of rollers, but also two or more pairs of rollers may be provided.

Herein, since the resin molding 110 is pulled out of the sizing equipment 30 in cooperation with the rotations of the rollers 42 and 43, the length (pulling length) of the resin molding 110 pulled out of the sizing equipment 30 is detected based on the amount of rotation of the rollers 42 and 43 and the diameter of rollers. That is, the motor M2 for driving the rollers 42 and 43 may be operated as a length detector to detect the pulling length of the resin molding 110. For example, a controller (typically a microcomputer having the CPU) 82 provided separately is electrically connected to the motor M2, as shown in FIG. 1, whereby a pulling length detection signal S4 as the amount of rotation of the rollers 42 and 43 is sent from this motor M2 to the controller 82. Regarding the value based on the signal S4 as the pulling length of the resin molding 110, the controller 82 controls the activation of the driving device 60 (specifically at least one of position (sense) and carriage of the X-direction movement support member 52 making up the molding gripping portion 54) in accordance with the pulling length (supply length).

Preferably, a pressure sensor 80 for measuring the pressure of molding material flowing through flow channel 22 of the die 20 is provided, and electrically connected to the controller 82, as shown in FIG. 1. With this constitution, the controller 82 can be operated as a motor driver for driving the rollers 42 and 43 of the pulling machine 40. As a result, the sensor 80 senses the pressure of the molding material 110 that is received on the inner wall face 22a of the molten resin flow channel 22 for the die 20, the drive source (rotation number of the motor) of the pulling machine 40 is controlled based on the sensed value, and the rotating speed of the rollers 42 and 43 is adequately increased or decreased in accordance with a increase or decrease variation in the pressure. Thereby, the pressure of the molding material 110 flowing through the molten resin flow channel 22 for the die 20 is made constant, so that the pressure of the molding material 110 against the inner wall face 31a of the sizing flow channel 31 is automatically maintained in a suitable range.

For example, the following control may be provided. That is, the controller 82 receives a pressure detection signal S1 from the pressure sensor 80 at every predetermined time continually. When the received pressure detection signal S1 corresponds to a preset pressure level (initial pressure level), a pulling speed command signal S3 is sent to the motor M2, whereby the motor M2 is controlled to pull the resin molding 110 at an initially set pulling speed (initial pulling speed). However, when the pressure detection signal S1 indicating a higher pressure than the initial pressure level is received due to some causes, the motor M2 is controlled to increase the rotating speed of the rollers 42 and 43 so that the pulling speed is higher than the initial pulling speed upon a pulling speed command signal S3. On the other hand, when the pressure detection signal S1 indicating a lower pressure than the initial pressure level is received due to some causes, the motor M2 is controlled to decrease the rotating speed of the rollers 42 and 43 so that the pulling speed is lower than the initial pulling speed upon a pulling speed command signal S3. In this way, the pressure of the molding material 110 against the inner wall face 31a of the sizing flow channel 31 is maintained in a suitable fixed range.

This controller 82 may be further connected to the drive source (motor) M1 of the screw 13 for the first extrusion machine 10. The motor M1 is controlled in the number of rotations in response to a pressure detection signal S1 from the pressure sensor 80, to regulate the amount of extruding the molding material 110 (volume or mass of molding material extruded per unit time) from the first extrusion machine 10, whereby the pressure of the molding material 110 against the inner wall face 31a of the sizing flow channel 31 is maintained in a suitable fixed range more effectively. For example, if the pressure detection signal S1 received by the controller 82 is higher (or lower) than the initial pressure level, a feeding speed control signal S2 is sent from the controller to the motor M1, whereby the motor M1 is controlled to decrease (or increase) the number of rotations of the screw 13.

The resin molding 110 having a pulling force (pushing force in the downstream direction) given by the rollers 42 and 43 of the pulling machine 40 is supplied via the bend supporting means 45 to the bender 50, as shown in FIG. 1. The bend supporting means 45 is provided with at least one pair of rollers 46 and 47 serving as a fulcrum in bending the molding 110, and preferably provided with two pairs of rollers to surround the resin molding 110 around the outer circumference from four sides. These rollers 46 and 47 are disposed to have the extension line in the feed direction (substantially the same as the extrusion direction from the exhaust port 38) of the resin molding 110 supplied from the pulling machine 40 carried from up and down or left and right. Accordingly, the resin molding 110 extruded from the exhaust port 38 passes between the rollers 46 and 47 in the extrusion direction (at a constant extrusion direction and a constant angle carriage) as it is. The bend supporting means 45 permits the movement of the resin molding 110 in the feed direction (extrusion direction) by the rollers 46 and 47, but inhibits the movement of the resin molding 110 in other directions (e.g., direction crossing the feed direction). To prevent the surface of the molding 110 from being damaged, it is preferable that the surface of the roller 46, 47 is processed smooth (preferably specular). Typically, the rollers 46 and 47 are connected to no driving mechanism for positively applying a force to the resin molding 110. The rollers 46 and 47 of this bend supporting means 45 serve as a bend fulcrum in bending the resin molding 110. When the bend supporting means 45 is not employed, the rollers 42 and 43 of the pulling machine 40 can be operated as the bend fulcrum.

As shown in FIG. 1, the coolant blowing means 48 for blowing coolant (e.g., liquid nitrogen) to the resin molding 110 passing through this portion is provided on the downstream side of the bend supporting means 45 and on the upstream side of the bender 50 (gripping portion 52). This coolant blowing means 48 is activated, as needed, to compulsorily cool the resin molding 110 from the outer surface. Thereby, the temperature condition of the resin molding 110 can be adjusted. For example, coolant (e.g., liquid nitrogen) is supplied from a coolant supply path 49 connected to the coolant tank (not shown) to the coolant blowing means 48 and blown from the coolant blowing means 48 to the resin molding 110. In FIG. 1, the coolant blowing means 48 in which coolant is blown from two positions above and beneath the resin molding 110 is typically illustrated, but the coolant blowing means 48 is not limited to the above constitution. For example, the blowing position of coolant, the blowing direction, and the number of blowing positions may be appropriately changed. Also, when the cooling is insufficient by the sizing equipment 30, the coolant blowing means having the same constitution may be provided between the pulling machine 40 and the bend supporting means 45.

The X-direction movement support member 52 and the driving mechanism 60 for changing its position and/or carriage will be described below.

Figure 8:
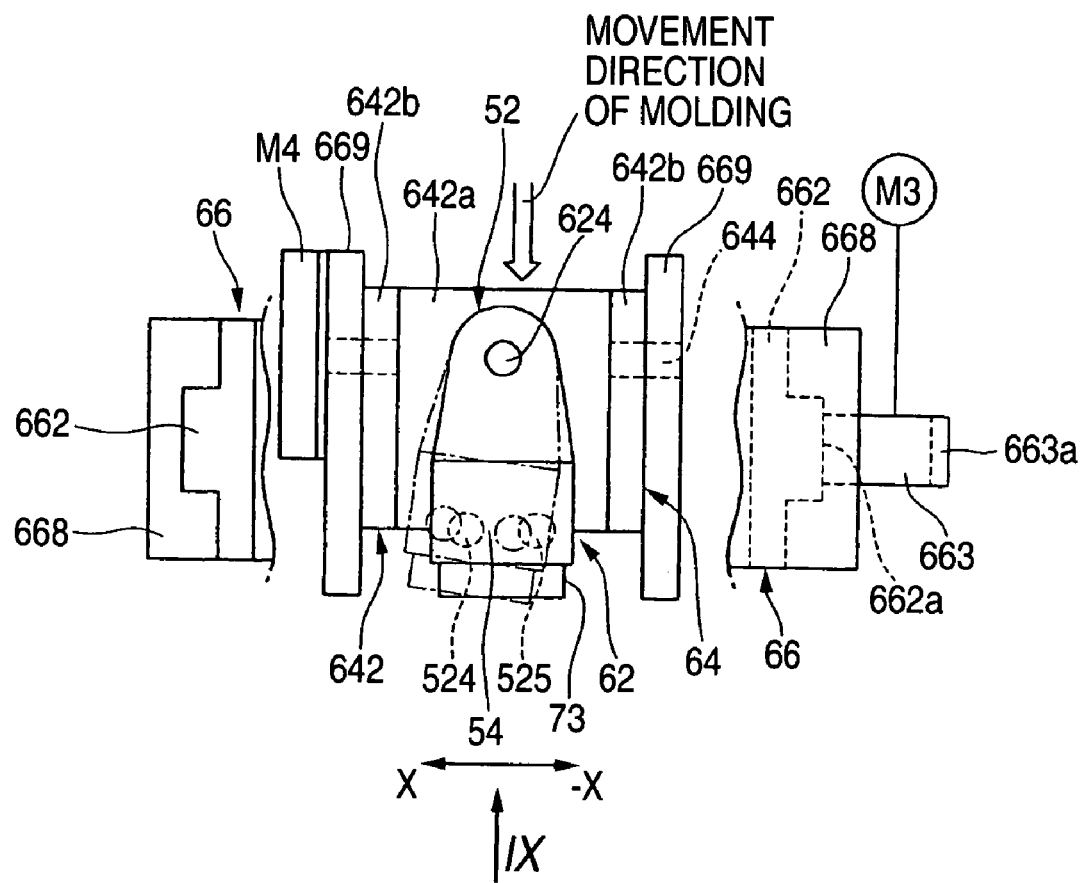
FIG. 8 is a plan view schematically showing the essence of FIG. 1.
Figure 9:
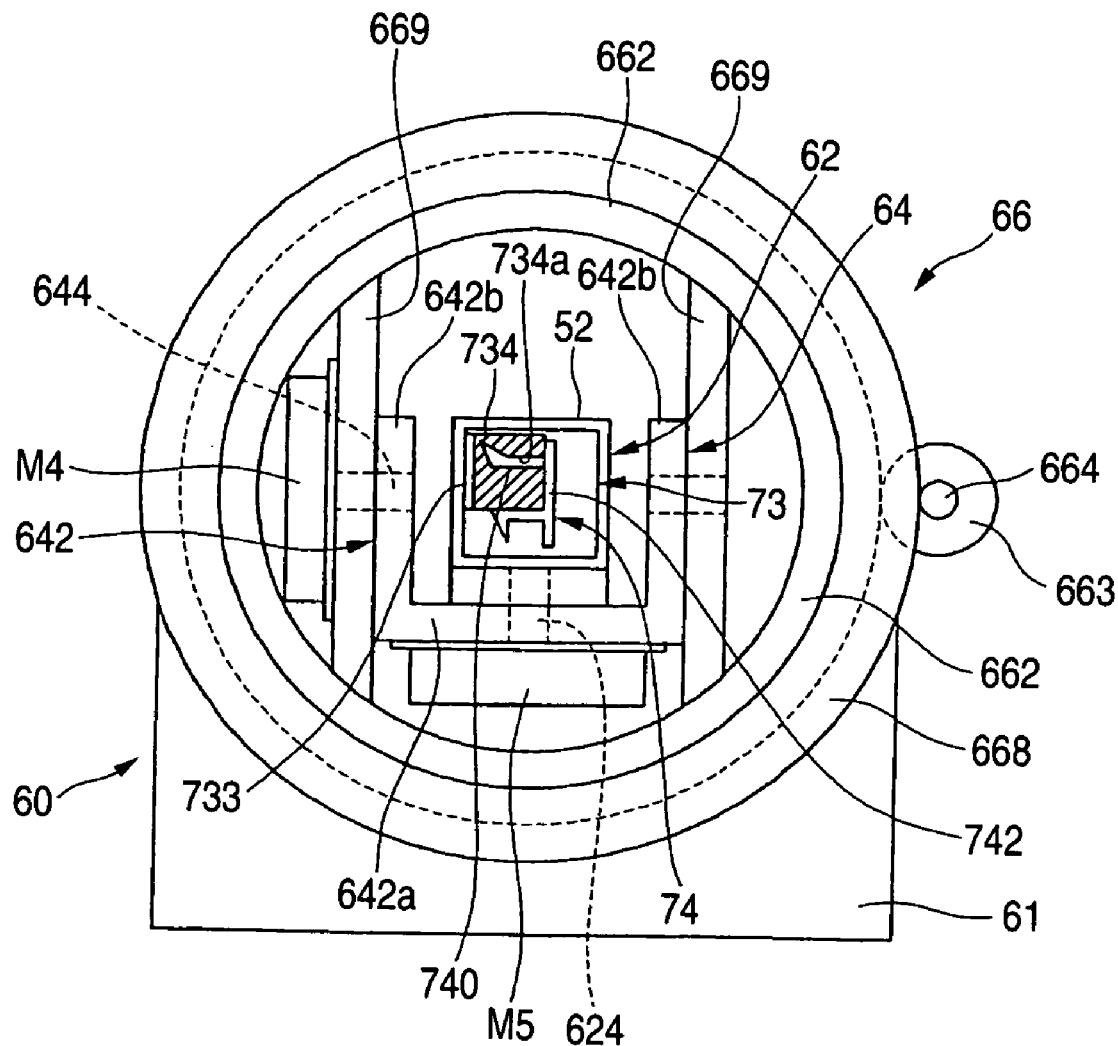
FIG. 9 is a view as seen from the IX direction of FIG. 8.

The driving mechanism 60 comprises an X-direction driving mechanism 62, a Y-direction driving mechanism 64, and a O-direction driving mechanism, which are independently operable, as shown in FIGS. 8 and 9. The whole of these driving mechanisms is supported on a base board 61, as shown in FIG. 9.

The θ-direction driving mechanism comprises a rotation support member 668 like a ring that is secured to the base board 61, a rotation member 662 like a ring that is rotatably fitted coaxially into the inner circumference of the rotation support member 668, a driving member 663 disposed on the outer circumference part of the rotation member 662, and a O-direction drive motor (servo motor that can be rotated in the forward and backward directions to make accurate rotation control) M3 as a drive source for driving the rotation of a drive shaft 664 keyed to the driving member 663. Flat teeth 663a are formed on the outer circumference of the driving member 663 and meshed with flat teeth 662a formed on the outer circumference of a rotation member 662. When the drive motor M3 is driven, the rotation of the driving member 663 is transmitted to the rotation member 662 because the flat teeth 662a and 663a are meshed, so that the rotation member 662 is rotated around its central point (not shown). Also, two plate-like rotation transmitting members 669 for transmitting its rotational movement to the X-direction driving mechanism 62 and the Y-direction driving mechanism 64 are provided in parallel on the inside (inner circumferential side) of the rotation member 662.

Also, the Y-direction driving mechanism 64 comprises a Y-direction movement supporting member 642 supported between the two rotation transmitting members 669 by a Y-direction driving shaft 644 and a Y-direction drive motor (servo motor) M4 as a drive source for driving the rotation of the Y-direction driving shaft 644 keyed to the Y-direction movement supporting member 642. This Y-direction supporting member 642 has a bottom face portion 642a and a pair of side face portions 642b rising from both sides thereof.

And the X-direction driving mechanism 62 comprises the X-direction movement supporting member 52 rotatably attached on the bottom face portion 642a of the Y-direction supporting member 642 via the X-direction driving shaft 624, and an X-direction drive motor (servo motor) M5 as a drive source for driving the rotation of the X-direction driving shaft 624 keyed to the X-direction movement supporting member 52.

The rotational direction drive motor M3, the Y-direction drive motor M4 and the X-direction drive motor M5 are independently controlled. The rotation member 662 is driven independently for rotation around its central point, the Y-direction movement supporting member 642 is driven independently for rotation around the Y-direction driving shaft 644, and the gripping portion (X-direction movement supporting member) 52 is driven independently for rotation around the X-direction driving shaft 624. Also, when not activated (at rest), the X-direction driving mechanism 62, the Y-direction driving mechanism 64 and the O-direction driving mechanism 66 are provided so that a passageway of the gripping portion 54 is coincident on the extension line of the axial line of the molding 110 at the position of the bend supporting means 45 (i.e., becomes the reference position).

This X-direction movement supporting member 52 comprises internally the molding gripping portion 54 having a cross sectional shape for slidably gripping the resin molding 110, as schematically shown in FIG. 1. The gripping portion 54 comprises at least one pair of supporting rollers 524 and 525 on the downstream side of the X-direction movement supporting member 52, as shown in FIG. 8. These supporting rollers 524 and 252 make contact with the outer surface of the resin molding 110 passing through the gripping portion 54 from all sides, to prevent the resin molding 110 from being dislocated or shifted within the gripping portion 54 in other directions than the insertion direction (longitudinal direction). The gripping portion 54 may comprise a shoe having a shape enlarging from the central part toward the entrance and exit sides, instead of the supporting rollers 524 and 545. In this case, the entire outer circumference of the resin molding 110 is gripped by the shoe.

The X-direction movement supporting member 52 having the gripping portion 54 is connected to the X-direction driving mechanism 62 by the X-direction driving shaft 624. If the X-direction movement supporting member 52 is driven for rotation by activating the motor M5 constituting the X-direction driving mechanism 62, the position (sense) of the gripping portion 54 in the X direction is changed (to any of the X direction). Also, if the Y-direction movement supporting member 642 is driven for rotation by activating the motor M4 constituting the Y-direction driving mechanism 64, the position (sense) of the gripping portion 54 is changed in the Y direction orthogonal to the X direction. Moreover, if the rotation member 662 is driven for rotation by activating the motor M3 constituting the O-direction driving mechanism 66, the angle carriage of the gripping portion 54 is changed. By changing the position and the angle carriage in combination, the gripping portion 54 is adjusted at any position (X direction, Y direction) and angle carriage (θ direction), and the position and angle carriage is changed at any time.

In addition, by driving for rotation the Y-direction movement supporting member 642 and the X-direction movement supporting member 52 independently, the gripping portion 54 is adjusted at any position (X direction, Y direction) and angle carriage (θ direction), and the position and angle carriage is changed at any time.

And if at least one of the position and the angle carriage of the gripping portion 54 are made different from the reference position (carriage), with reference to the extrusion direction and angle carriage of the resin molding 110 when extruded from the exhaust port 38 or forwarded from the bend supporting means 45, the gripping portion 54 acts as a point of application of bending to perform at least one of the axial bending process and the twisting process for the resin molding 110 passing through the gripping portion 54. This process will be described in the following.

Figure 10:
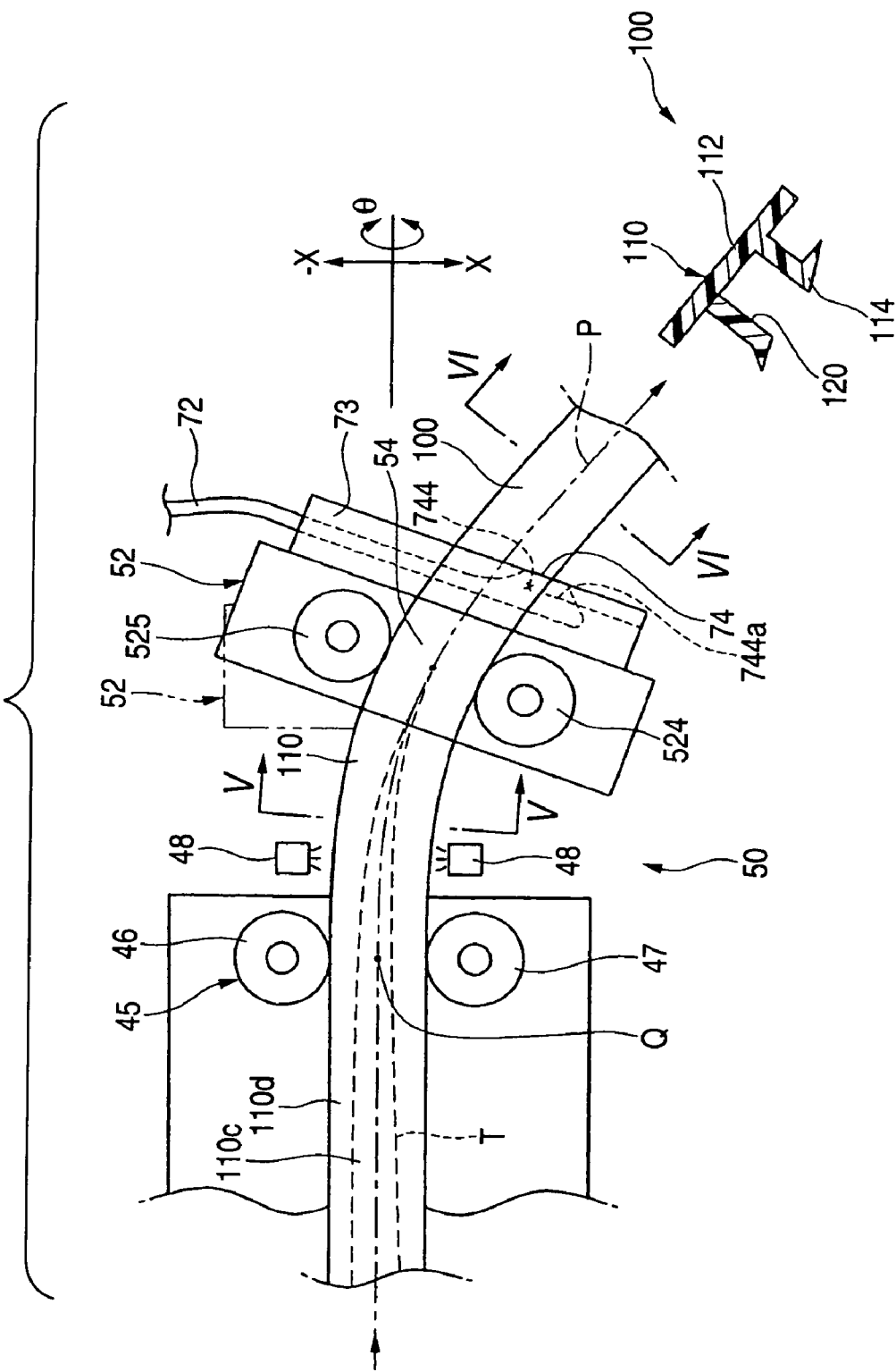
FIG. 10 is a plan view schematically showing the essence of FIG. 8, showing the operation of a bender for the manufacturing apparatus according to one embodiment.

The resin molding 110 is extruded from the exhaust port 38 at a constant extrusion direction and a constant angle carriage according to the shape of the sizing flow channel 31, and passed through the bend supporting means 45 owing to a force (pulling force, pushing force) in the same direction as its extrusion direction given by the pulling machine 40. The movement direction and angle carriage of the resin molding 110 are substantially the same as when extruded from the exhaust port 38, until it passes through the bend supporting means 45, as shown in FIGS. 8 and 10.

The resin molding 110 passing through the bend supporting means 45 is regulated in an appropriate temperature state by being cooled from the outer surface by activating the coolant blowing means 48 in the next bending process, as needed, when the temperature is too high, and supplied to the gripping portion 54 of the X-direction movement supporting member 52 for the bender 50. Herein, the gripping portion 54 of the X-direction movement supporting member 52 is located on the extension line from the exhaust port 38 in the extrusion direction and disposed at the same angle carriage as that of the resin molding 110 as extruded from the exhaust port 38, when the bender 50 is not activated as indicated by the solid line in FIG. 8. In this case, the resin molding 110 supplied to the gripping portion 54 is forwarded with the almost same shape and carriage to the downstream side.

On the other hand, when the resin molding 110 extruded from the exhaust port 38 is bent in the X direction, for example, the X-direction movement supporting member 52 is placed from the position as indicated by the solid line to the position as indicated by the dashed line in which it is rotated counterclockwise around the X-direction driving shaft 64, as shown in FIG. 8. In FIG. 10, the X-direction movement supporting member 52 in the moved state is indicated by the solid line, and the position of the X-direction movement supporting member 52 before rotation is indicated by the two dot chain line. Owing to this rotation, the gripping portion 54 is disposed with its molding exit directed toward the position displaced in the X direction (to the left in FIG. 8, downward in FIG. 10) on the extension line from the exhaust port 38 in the extrusion direction. Then, the resin molding 110 extruded from the exhaust port 38 is moved in the same direction as the extrusion direction up to the bend supporting means 45, but is passed through the gripping portion 54 forcefully displaced toward the X direction on its downstream side, so that its movement direction is changed in the X direction with the position (same position as the X-direction driving shaft 64) where the rollers 46 and 47 of the bend supporting means 45 are provided as a bend fulcrum Q, as shown in FIG. 10.

From the above description, it will be apparent to those skilled in the art that the bending process in the Y direction and the twisting process in the 0 direction (rotational direction) are likewise performed.

In this way, for the extrusion direction and angle carriage of the resin molding 110 from the exhaust port 38, the resin molding 110 is axially bent or twisted or bent and twisted by passing the resin molding 110 through the gripping portion 54 disposed at the carriage different from at least one of the position (sense) and the angle carriage displaced from the extrusion direction. Herein, in the case of manufacturing the resin molding in which the bending direction and degree (radius of curvature) and the twisting direction and degree (intensity) over the entire resin molding in the longitudinal direction are constant, the resin molding 110 may be passed through the gripping portion 54 that is kept and fixed at constant position (sense) and carriage. On the other hand, in the case of manufacturing the resin molding (the base molding 110 making up the molding 100 of the overall shape as shown in FIGS. 2 and 3) in which the bending direction, radius of curvature and twisting intensity are different between one part and the other part in the longitudinal direction as in this embodiment, the position and carriage of the gripping portion 54 is changed while the resin molding 110 is passed through it. The control of the motors M3 to M5 to change such position and carriage may be made with reference to the time elapsed, employing the time elapsed as a substitute value of the passage length of the molding 110, when the resin molding 110 is supplied to the bender 50 at a constant speed and passed through the gripping portion 54. Also, the motors M3 to M5 may be controlled in accordance with the passage length of the resin molding 110 passing through the gripping portion 54 to make at least one of the bending process and twisting process at higher precision.

For example, the constitution as shown in FIG. 1 may be taken to control the motors M3 to M5 in accordance with the length of the resin molding 110 passing through the gripping portion 54. The O-direction drive motor M3, the Y-direction drive motor M4 and the X-direction drive motor M5 are electrically connected to the controller 82. This controller 82 detects the length (pulling length) of the resin molding 110 fed from the pulling machine 40 to the downstream side in accordance with a pulling length detection signal S4 from the length detector (motor M2) connected to the pulling machine 40. The controller 82 sends out a rotation drive signal S5 to the O-direction drive motor M3, a Y-direction drive signal S6 to the Y-direction drive motor M4, or an X-direction drive signal S7 to the X-direction drive motor M5 in accordance with a predetermined program so that each portion in the longitudinal direction of the resin molding 110 is processed at least one of desired radius of curvature and desired twisting intensity in accordance with its pulling length. With these signals S5 to S7, the driving mechanism 60 is controlled in synchronism with the actual extrusion length of the resin molding 110 (length of the resin molding 110 passing through the gripping portion 54), and at least one of the disposed position (typically at least one direction of the X and Y directions) and the angle carriage (θ direction) of the gripping portion 54 is controlled (changed) to make at least one of a desired bending process and a desired twisting process in accordance with the length of the resin molding 110 passing through the gripping portion 54. Also, instead of the above control method, another method for detecting the pulling length of the resin molding 110 (passing through the gripping portion 54) may be available by providing a separate rotary encoder near the pulling machine 40.

The at least one of bending process and twisting process is performed at high shape precision by conducting such control. In particular, when the pulling speed is regulated in accordance with an input signal (pressure detection signal S1) from the pressure sensor 80, the pulling speed (extrusion speed) is not necessarily constant because the pulling speed is controlled to be increased or decreased to maintain the pressure within a predetermined range. In this case, it is effective to use a method for controlling the position (sense) and carriage of the gripping portion 54 in accordance with the length of the resin molding 110 passing through the gripping portion, employing a pulling length detection signal S4, as described above. Thereby, the extrusion is performed excellently by keeping the resin pressure within the extrusion die constant, so that the position and carriage of the gripping portion 54 are changed at high precision, when the extrusion speed is varied, and the high precision bending and twisting process is performed in each portion of the resin molding 110. In the apparatus of this embodiment, the O-direction driving mechanism 66, the Y-direction driving mechanism 64 and the X-direction driving mechanism 62 are disposed in this order as seen from the side of the base board 61, but may be disposed in a different order, in which the X-direction driving mechanism 62, the Y-direction driving mechanism 64 and the O-direction driving mechanism 66 are disposed, for example.

The resin molding 110 (base molding making up the molding 100) having one or both of desired bend and desired twist is forwarded from the gripping portion 54 to the downstream side in this above way. In this embodiment, subsequently, the concealing portion 120 is formed using the molding material of substantially the same composition as the base molding material in a predetermined portion of the base molding 110 (on both sides of the leg portion 114 as shown in FIG. 6). In the following, a concealing portion molding unit for forming the concealing portion 120 will be described.

As shown in FIGS. 1, 8, 9, 10 and 11, a second extrusion die (extrusion dies) 73 for molding the concealing portion 120 is integrally mounted (connected) on an end face downstream of the X-direction movement supporting member 52 (gripping portion 54). Accordingly, the second extrusion die 73 is moved along with the movement of the gripping portion 54 (change of at least one of position and carriage). Thereby, the second extrusion die 73 is disposed at least one of the position and carriage corresponding to (linked with) at least one of the axial position and the angle carriage of the base molding 110 passing through the gripping portion 54 by activation of the driving mechanism 60. Also, a heat insulating layer (typically a space), not shown, is provided between the X-direction movement supporting member 52 and the second extrusion die 73, thereby preventing heat of the second die 73 from conducting to the gripping portion 54. In FIGS. 8, 9, 10 and 11, the cutting-off machine 76 is not illustrated to make the understanding easier. Also, in FIG. 11, the pulling machine 40 is illustrated more simply.

Figure 11:
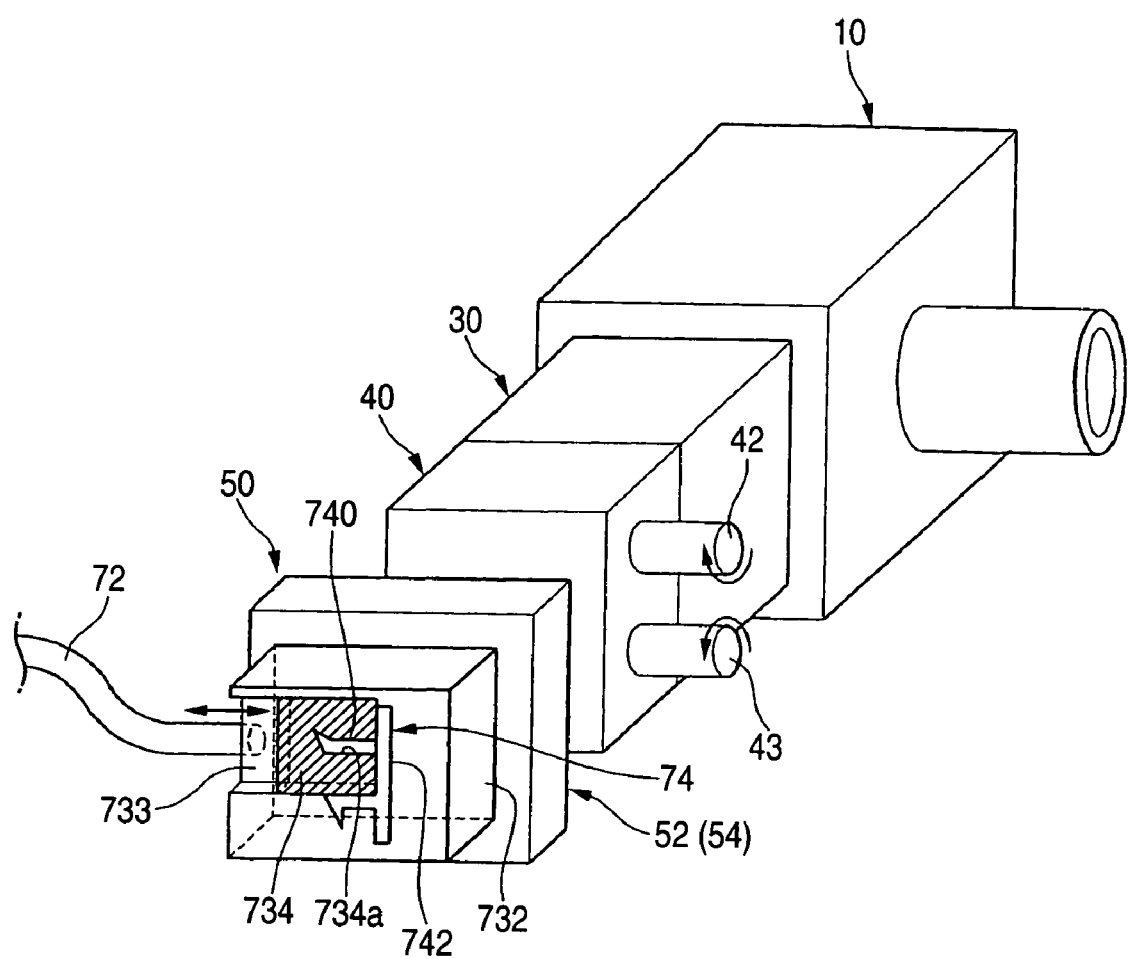
FIG. 11 is a perspective view showing the essence of FIG. 1.

As shown in FIG. 1, the second extrusion die 73 is in communication to a cylinder 71 of the second extrusion machine 70. The concealing portion molding material heated and molten within the cylinder 71 is forwarded to the distal end of the cylinder 71 by rotation of a screw 75 that is controlled by the drive source (motor) M6, and supplied through a flexible pipe 72 to the second extrusion die 73 having a heater, not shown. This flexible pipe 72 connects the cylinder 71 and the second extrusion die 73 with a tolerance of length to allow the change in at least one of the position and carriage of the gripping portion 54 to be fully followed, as shown in FIGS. 10 and 11. The flexible pipe 72 is preferably provided with heating means, not shown, so that the temperature of the concealing portion molding material in heated and molten state supplied from the cylinder 71 may not be lowered excessively during the transfer.

As clearly shown in FIGS. 9 and 11, the second extrusion die 73 comprises a die main body 732 roughly like a square pole and a movable member (movable die) 734 like a plate provided slidably on the die main body 732 along a groove 733 formed on the end face downstream of the die main body 732. As schematically shown in FIG. 1, an insertion hole 742 (see FIG. 1) having a cross sectional shape corresponding to that of the base molding 110 is formed inside the die main body 732. Also, the die main body 732 is formed with a second member molding material flow channel 744 (see FIG. 10) for circulating the concealing portion molding material in heated and molten state that is supplied through the flexible pipe 72. This second member molding material flow channel 744 is opened into the groove 733 on the end face downstream of the die main body 732. The movable member 734 can partially shield an opening 744a of the second member molding material flow channel 744, and regulate the degree of shielding using a sliding movement within the groove 733. As schematically shown in FIG. 1, the movable member 734 is connected to a movable member drive motor (drive source) M7 for implementing the sliding movement. Also, the movable member 734 is formed with a notch 734a to overlap the opening 744a of the second member molding material flow channel 744. FIG. 11 shows one example of the "shutter system", as described previously.

The substantial opening shape of a second member molding opening 740, through which the concealing portion molding material supplied to the second member molding material flow channel 744 is extruded from the second extrusion die 73, is determined by the opening 744a and the notch 734a. The substantial opening shape of the second member molding opening 740 is changed depending on an overlapped state of the opening 744a of the second member molding material flow channel 744 and the notch 734a of the movable member 734 by sliding the movable member 734 (relative to the die main body 732). Thereby, the cross sectional shape of the concealing portion (second member) 120 molded of the concealing portion molding material extruded through the second member molding opening 740 can be changed. For example, when the movable member 734 is located at the rearmost position of the groove 733 (position as shown in FIG. 11), the extent that the opening 744a and the notch 734a overlap is largest, and the length of the concealing portion (projection length of the concealing portion 120 from the head portion 114 as shown in FIG. 6) extruded through the second member molding opening 740 is shortest. If the movable member 734 is moved to the entrance side of the groove 733 (on the left as one faces in FIG. 11), the extent that the opening 744a and the notch 734a overlap is reduced, so that the concealing portion 120 having a larger projection length is extruded through the second member molding opening 740.

The insertion hole 742 and the second member molding material flow channel 744 communicate in a part on the downstream side. The exhaust port 74 having a cross sectional shape of combining the opening shape (constant) of the insertion hole 742 and the opening shape (variable) of the second member molding opening 740 is opened on the end face downstream of the die main body 732, as shown in FIG. 11.

The base molding 110 molded in a predetermined bend and twist shape by passing through the gripping portion 54 of the bender 50 is directly supplied to the second extrusion die 73 connected to the downstream side of the gripping portion 54. And the concealing portion molding material in heated and molten state is supplied to the second extrusion die 73, and extruded through the exhaust port 74 together with the base molding 110 by following the bend and twist of the base molding 110 passing through the second extrusion die 73 (insertion hole 742). Thereby, the concealing portion 120 made of the concealing portion molding material is integrated with the base molding 110 (back face of the head portion 112) to extrude the molding 100 having the cross sectional shape as shown in FIG. 6. At this time, the concealing portion 120 having a different cross sectional shape (projection length) between one part and the other part in the longitudinal direction is extruded and integrated with the base molding 110 by changing (sliding) the position of the movable member 734 depending on the length of the base molding 110 passing through the insertion hole 742 by activation of the drive source M7.

In FIG. 1, the motor M6 for driving the screw 75 may be electrically connected to the controller 82. With this constitution, the controller 82 controls the number of rotations of the screw 75 by sending a drive signal to the motor M6 in accordance with a pulling off length detection signal S4 from the pulling machine 40, thereby regulating the amount of feeding the concealing portion molding material 120 from the second extrusion machine 70. Thereby, in the case where the pulling speed (roughly corresponding to the supply speed of the base molding 110 supplied to the second extrusion die 73) is regulated to maintain the pressure in a predetermined range in accordance with a pressure detection signal S1 from the pressure sensor 80, an adequate amount of concealing portion molding material 120 is supplied to the die 73 by increasing or decreasing the amount of extrusion in accordance with its pulling speed.

Also, the motor M7 for driving the movable member 734 may be electrically connected to the controller 82 in FIG. 1. With this constitution, the controller 82 controls the position of the movable member 734 by sending a drive signal to the motor M7 in accordance with a pulling off length detection signal S4 from the pulling machine 40, thereby regulating the substantial opening shape of the second member molding opening 740 to form precisely the concealing portion 120 having a cross sectional shape (projection length) according to its position at a predetermined position of the base molding 110 in the longitudinal direction.

Also, in the second extrusion die 73, the insertion hole 742 and the molding material flow channel 744 communicate in a portion on the downstream side, and the opening shape of the exhaust port 74 is coincident with the cross sectional shape of combining the base molding 110 and the concealing portion 120. Employing the second extrusion die 73 of this constitution, the concealing portion molding material 120 in heated and molten state is extruded through the exhaust port 74 while being in contact with the base molding 110. On the other hand, the second extrusion die 73 may be employed in which the insertion hole 74 and the molding material flow channel 744 are open slightly apart (at neighboring position) on the exit side of the second extrusion die 73. Accordingly, the opening shape of the exhaust port 74 and the cross sectional shape of combining the base molding 110 and the concealing portion 120 are slightly different. In this case, the concealing portion 120 is integrated along the shape of the base molding 110 by rapidly contacting the concealing portion molding material extruded in heated and molten state through the opening 744a of the molding material flow channel 744 with the base molding 110 on the downstream side of the second extrusion die 73 (typically before the concealing portion molding material is solidified).

Figure 12:
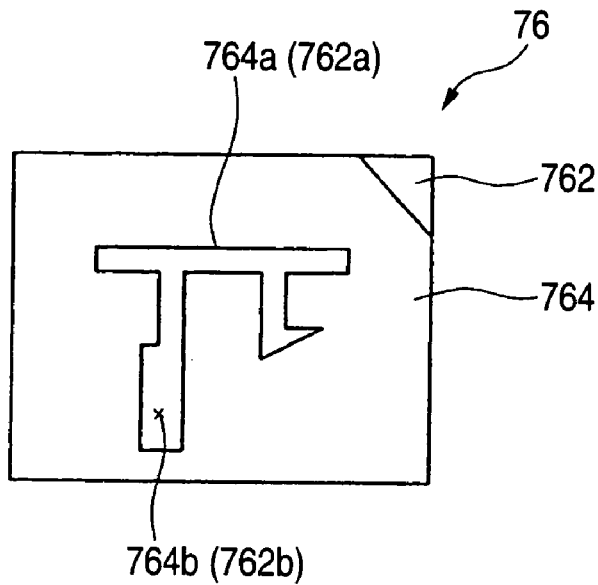
FIG. 12 is an explanatory view showing a cutting off machine for the manufacturing apparatus according to one embodiment.

The cutting-off machine 76 having a fixed cutting die 762 and a movable cutting die 764 is connected to the end face downstream of the second extrusion die 73, as shown in FIGS. 1 and 12. The fixed cutting die 762 disposed on the upstream side is mounted integrally with the end face downstream of the second extrusion die 73. The movable cutting die 764 disposed on the downstream thereof has an actuator A such as a liquid pressure cylinder connected, as shown in FIG. 1. This actuator A drives the movable cutting die 764 to be moved in a plane direction (direction crossing the molding 100) relative to the fixed cutting die 762, as shown in FIG. 13.

This fixed cutting die 762 is provided with a through hole 762a having a cross sectional shape into which the molding 100 extruded from the second extrusion die 73 is inserted. Also, the movable cutting die 764 is provided with a through hole 764a of the same shape as the through hole 762a of the fixed cutting die 762. Herein, the cross sectional shape of the molding 100 (concealing portion 120) is different between one part and the other part in the longitudinal direction. Therefore, of the through holes 762a and 764a, the concealing portion insertion areas 762b and 764b for passing the concealing portion 120 are formed in the cross sectional shape to deal with a variation in the projection length (cross sectional shape) of this concealing portion 120. More specifically, they are formed in the cross sectional shape corresponding to the maximum projection length of the concealing portion 120. When the through hole 762a of the fixed cutting die and the through hole 764a of the movable cutting die are matched in the position, the molding 100 extruded through the exhaust port 74 is passed directly through the through holes 762a and 764a and fed to the downstream side, as shown in FIG. 12. And when the molding 100 is fed with a bend and twist at least one of a constant radius of curvature and a constant angle along the longitudinal direction, the actuator A is activated at a predetermined position, on reaching a predetermined length, to move the movable cutting die 764 relative to the fixed cutting die 762, so that the molding 100 is cut off into desired length, as shown in FIG. 13.

The actuator A for moving the movable cutting die 764 may be electrically connected to the controller 82, as shown in FIG. 1. With this constitution, in the case where the pulling speed of the base molding 110 (roughly corresponding to the extrusion speed of the molding 100 extruded through the exhaust port 74) is regulated to maintain the pressure in a predetermined range in accordance with a pressure detection signal S1 from the pressure sensor 80, the controller 82 controls the drive timing of the actuator A by sending a cutting-off machine drive signal S8 to the actuator A in accordance with a pulling length detection signal S4 from the pulling machine 40 (the actual pulling length), thereby cutting the molding 100 at high precision.

Figure 13:
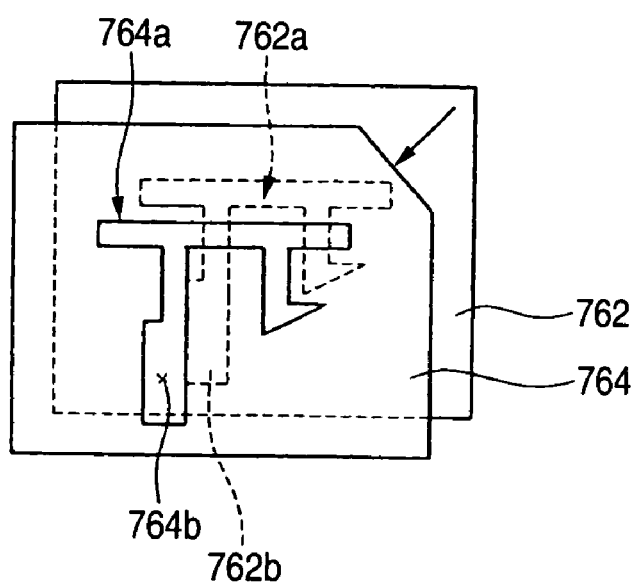
FIG. 13 is an explanatory view showing the operation of the cutting off machine for the manufacturing apparatus according to one embodiment.

The movable cutting die 764 is moved in the left lower direction in FIG. 13, but the movement direction of the movable cutting die 764 is not limited to the left lower direction. Also, instead of the cutting-off machine constituted in the above way, the cutting-off machine of the type with a rotary knife (rotary saw) may be employed. In this case, a motor for driving the rotary knife is electrically connected to the controller 82 in the same way as above, whereby the drive timing of the cutting-off machine is controlled at high precision in accordance with the pulling length of the base molding 110. Also, the second extrusion die and the cutting-off machine may not be connected as above but placed apart.

The manufacturing apparatus 1 of this embodiment may comprise a cooling machine for compulsorily cooling the molding 100 including the concealing portion 120, after integrating the base molding 110 with the concealing portion 120. For example, the cooling machine having a cooling vessel for accepting and cooling the molding 100 cut into desired length and a cooling water supply source for supplying cooling water to the cooling vessel may be arranged downstream of the cutting-off machine 76. With this arrangement, the molding 100 extruded through the exhaust port 74 is rapidly introduced into the cooling vessel to cool the overall molding completely. Alternatively, the cooling machine may be disposed but the cutting-off machine 76 as shown in FIG. 1 may be omitted, whereby the molding 100 extruded through the exhaust port 74 is introduced into the cooling vessel and cooled, and another cutting-off machine cuts the molding 100 into a predetermined length on the downstream side of the cooling machine. Also, a cooling machine for blowing appropriate coolant to the molding 100 extruded through the exhaust port 74, like the coolant blowing means 48, may be provided, and the molding 100 may be cut into predetermined length by another cutting-off machine on the downstream side of the cooling machine.

With the above embodiment, the long molding with less deformation of the cross sectional shape can be produced at higher precision as compared with the case where the linear molding having the cross sectional shape as shown in FIG. 6 is extruded through the extrusion process at a time, cut into predetermined length, and bent and twisted. This effect is preferably exhibited not only in the case where the first member (base molding) and the second member (concealing portion) are formed of the resin molding material of the same composition, but also in the case where the first member and the second member are formed of the resin molding material of different compositions (e.g., the first member has higher hardness and rigidity than the second member). Even in the case where the first member and the second member are formed of the molding material of the same composition as in the above embodiment, the first member and the second member may have different material properties (degree of crystallinity, etc.), depending on the temperature of molding material in extruding each member and the cooling speed after extrusion.

Though the manufacturing apparatus 1 of the constitution as shown in FIG. 1 is employed in this embodiment, the manufacturing apparatus may be modified in various ways.

Figure 14:
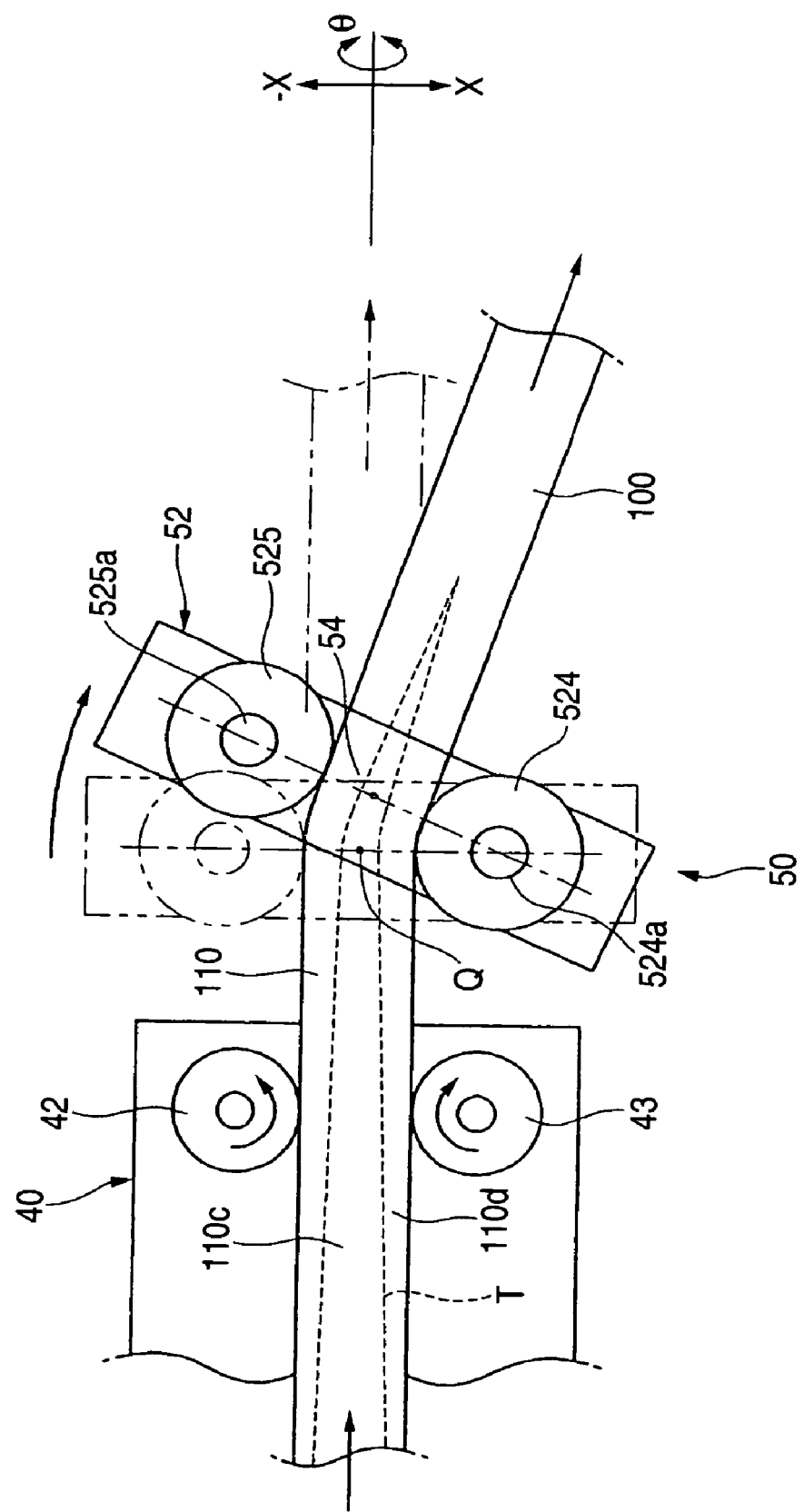
FIG. 14 is a plan view schematically showing the essence of FIG. 8, showing the operation of the bender for the manufacturing apparatus according to one embodiment.

For example, the bend supporting means 45 may be omitted from the manufacturing apparatus 1, and the pulling rollers 42 and 43 of the pulling machine 40 may be employed as the axial bend fulcrum. In the example of FIG. 14, the resin molding 110 passing through the pulling machine 40 is directly supplied to the gripping portion 54 of the X-direction movement supporting member 52 without interposition of the bend supporting means 45. The gripping portion 54 is provided with at least two support rollers 524 and 525, in which at least one of the position and angle carriage is changed at will by the driving mechanism, not shown, in the same way as in the above embodiment. The resin molding 110 extruded at a constant extrusion direction and a constant angle carriage through the exhaust port 38 of the sizing flow channel 31 is given a pulling force (pushing force to the gripping portion 54) in the same direction as the extrusion direction by the pulling rollers 42 and 43 of the pulling machine 40, and supplied to the gripping portion 54. Herein, when the X-direction movement supporting member 52 is located at the reference position (as indicated by the two-dot chain line in FIG. 14), the resin molding 110 passes through the gripping portion 54 in the extrusion direction from the exhaust port 38 (without the axial bending process). On the other hand, if the gripping portion 54 is placed in a state where it is rotated around its drive shaft (e.g., the same position as the rotational shaft of the supporting roller 524) as indicated by the solid line in FIG. 14, the gripping portion 54 is displaced to the position out of the initial extrusion direction of the resin molding 110. Thereby, the resin molding 110 passing through the gripping portion 54 is bent. In the bending process at this time, when the gripping portion 54 is located at the reference position, the position through which the shaft center P passes becomes the bend center Q. In FIG. 14, for simplification of explanation, the coolant blowing machine, the concealing portion formation unit (second extrusion die, etc.) and the cutting-off machine are not illustrated.

Alternatively, the gripping portion 54 may be held by a gimbal mechanism, which is moved in the X direction orthogonal to the feeding direction of the resin molding and the Y direction orthogonal to the X direction. In this case, the constitution of the apparatus is simplified.

Also, the sizing equipment is not limited to the above constitution, but the heat conduction member 25 may be omitted. In the above embodiment, the cross sectional shape of the sizing flow channel 31 is almost constant before and after the flow channel, but the cross sectional shape of the sizing flow channel 31 may be gradually enlarged toward the downstream side in a partial area on the entrance side of the flow channel. The operation condition (usage) of the sizing equipment is not limited to the above condition, but a molten portion 110b of the molding material 110 may remain on the downstream side of the exhaust port 38, for example. At a stage where the resin molding is extruded through the exhaust port 38, at least the surface of the resin molding may be solidified at the heat distortion temperature or less, and the inside may be kept at higher temperature than the surface temperature.

A material containing crystalline resin as the main component may be used as the resin molding material 110. In this case, it is possible to cool the resin molding material 100 from the outer surface within the sizing flow channel 31 so that the outer surface of the resin molding 100 has a lower degree of crystallinity than the inside.

The resin molding 110 extruded through the exhaust port 38 may be in a state capable of plastic deformation in performing the bending or twisting process (typically from the time when it is extruded through the exhaust port 38 to the time when it passes through the gripping portion 54). FIG. 10 schematically shows one example of the resin molding 110 in the most preferred temperature condition before and after passing through the gripping portion 54. Among the resin molding 110, a portion 110c inside the dotted line T in FIG. 10 is in a condition where the temperature is above the heat distortion temperature, and below the melting temperature, and a portion 110d on the side of the outer surface outside the dotted line T is in a condition where the temperature is below the heat distortion temperature of the resin molding material composing the resin molding. As shown in FIG. 10, it is preferable to perform at least one of the bending process and the twisting process in such a manner that when passing through the bend supporting means 45, the resin molding 110 is in a condition where the temperature on the outer surface is lower than the heat distortion temperature, and the temperature on the inside is higher than the heat distortion temperature and lower than the melting temperature, and when passing through the gripping portion 54, the resin molding 110 is in a condition where the temperature of the almost entirety is lower than the heat distortion temperature. Alternatively, there may remain the portion 110c inside the resin molding 110 in the condition where the temperature is higher than the heat distortion temperature even after passing through the gripping portion 54, as shown in FIG. 14. There is the advantage as previously described in performing at least one of the axial bending process and the twisting process with this temperature condition kept.

Also, in the manufacturing apparatus according to the above embodiment, the pulling machine 40 is provided and the movement speed of the resin molding 110 is regulated to keep the pressure within the extrusion die constant. However, the movement speed of the resin molding (shaped molding material 110) may be regulated only by increasing or decreasing the extrusion amount (supply amount) of the molding material 110 from the extrusion machine 10 without providing the pulling machine 40.

Also, in addition to the constitution of the manufacturing apparatus 1, a third extrusion machine may be placed, in which additional molding portions (concealing portion, etc.) composed of two kinds of molding materials may be added to the base molding.

Figure 15:
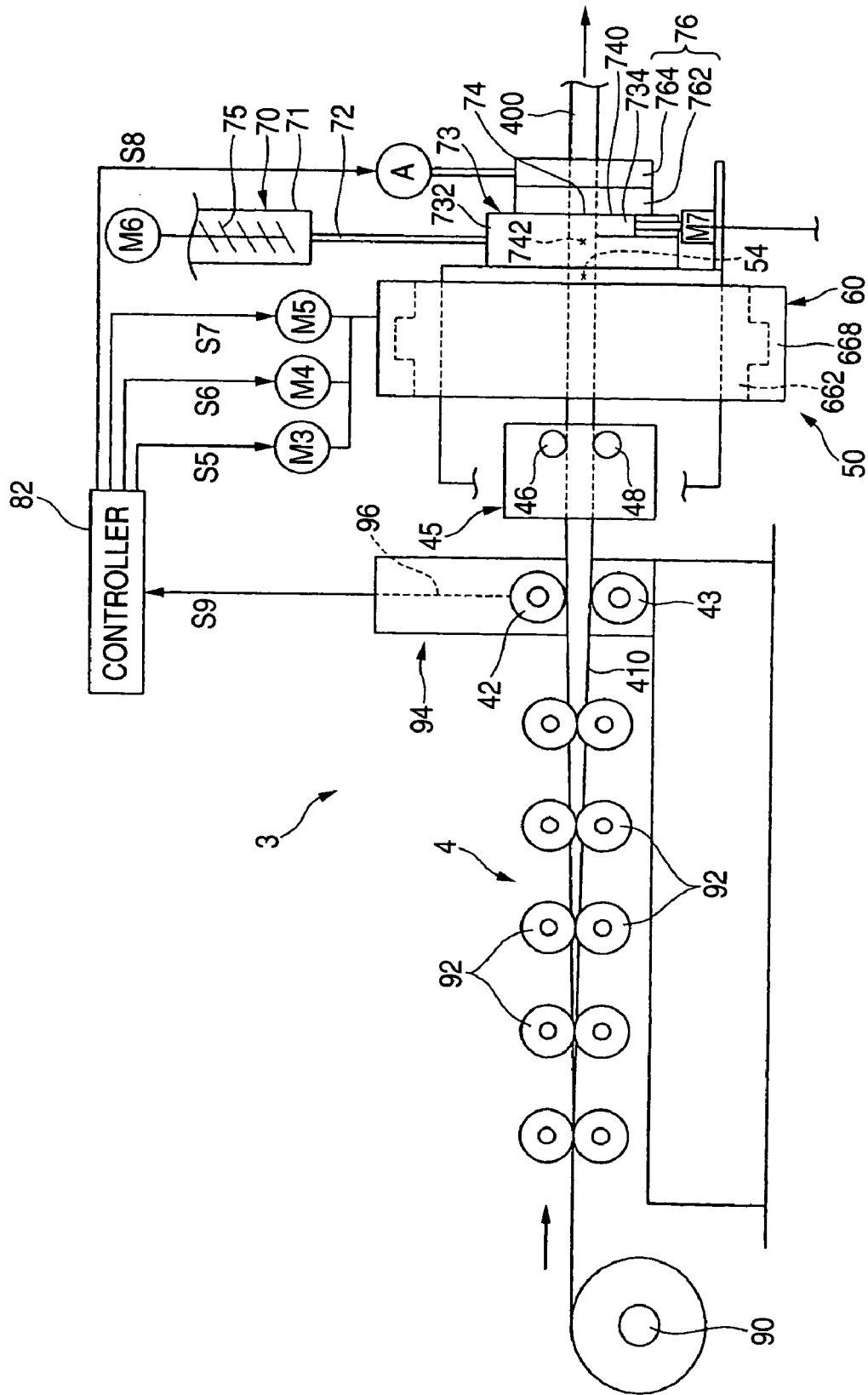
FIG. 15 is a schematic explanatory diagram showing another example of the long molding manufacturing apparatus for practicing the manufacturing method of the invention.

In the above embodiment, the long molding manufacturing apparatus 1 comprising the first member molding unit 2 forming the resin base molding (first member) is employed to manufacture the molding 100, as schematically shown in FIG. 1. However, instead of the resin molding unit, the long molding manufacturing apparatus 3 may comprise a roll molding machine 4 forming the metallic base molding or the base molding for use as the metallic core substance, as schematically shown in FIG. 15. This manufacturing apparatus 3 manufactures the long molding 400 in which the first member formed of metallic material and the second member formed of resin molding material are integrated. In the following, the parts having the same functions as in the previous embodiment as shown in FIGS. 1 to 13 are designated by the same reference numerals or signs, and not described here.

The roll forming machine 4 having plural pairs (typically five pairs herein) of forming rollers 92 is provided on the upstream side of the manufacturing apparatus 3. These forming rollers 92 are connected to a drive source (motor), not shown. The metallic strip material such as steel or stainless steel supplied from an uncoiler 90 is continuously fed to the downstream side, while being formed (so-called roll formed) into predetermined cross section by these forming rollers. The metallic molding 410 is introduced into a first member measuring instrument 94 provided at the downstream position of the roll forming machine 4.

The first member measuring instrument 94 comprises a pair of rollers 42 and 43. These rollers 42 and 43 are located to carry the extension line in the feed direction of the metallic molding 410 from the roll forming machine 4 from the upper and lower sides, and rotatably disposed. These rollers 42 and 43, which are in contact with the metallic molding 410, rotated along with the movement of the metallic molding 410. Also, the first member measuring instrument 94 comprises a length detector 96 (e.g., rotary encoder for detecting the rotation amount of the rollers 42 and 43) for detecting the length of the metallic molding 410 passing by it. The length detector 96 sends a passage length detection signal S9 to the controller 82, and controls the activation of the driving mechanism 60 in accordance with the passage length (supply length of the metallic molding 410).

The bender 50 having the same constitution, except that the coolant blowing means 48 is omitted from the constitution as shown in FIG. 1, is provided on the downstream side of the first member measuring instrument 94. By changing at least one of the position and the carriage of the gripping portion 54 in accordance with the drive signals S5, S6 and S7 from the controller 82, the metallic molding 410 passing through the gripping portion 54 can be subjected to at least one of the axial bending and twisting process. And this metallic molding 410 is introduced into the second extrusion die (second member extrusion die) 73 constituted in the same way as in the above embodiment, and extruded together with the concealing portion molding material in heated and molten state (e.g., resin molding material having the same composition as in the above embodiment). In this way, the long molding 400 is produced.

The above specific examples of the invention have been given only by illustration purpose, but by no means limit the scope of the invention as defined in the claims. The techniques as described in the claims may include various variations or changes of the specific examples as illustrated.

Also, the technical elements as described in this specification or drawings exhibit the technical availability singly or in combination of elements, but the combinations may not limited to those as defined in the claims at the time of application. Also, the techniques as exemplified in this specification or drawings accomplish plural purposes at the same time, and has a technical availability only by accomplishing one of the purposes.

What is claimed is:

1. A method for manufacturing a long resin molding having an axial bend, comprising:

supplying a resin molding material in heated and molten state extruded from an extrusion die to a sizing flow channel of a sizing equipment;

solidifying the resin molding material by cooling from outside within the sizing flow channel to calibrate the resin molding into a predetermined cross sectional shape;

extruding the resin molding of the predetermined cross sectional shape from an exhaust port of the sizing flow channel at a constant extrusion direction and a constant angle carriage and in a state capable of plastic deformation;

supplying continuously the resin molding to a molding gripping portion of a bender disposed on a downstream side of an exhaust port of the sizing equipment along the constant extrusion direction, the gripping portion slidably gripping the resin molding; and controlling a degree of a radius of curvature of a bend in the resin molding in an axial bending process for the resin molding when the resin molding passes through the gripping portion by changing a position of the gripping portion to a position not along the constant extrusion direction; and applying a force on the resin molding in the same direction as the extrusion direction on the downstream side of the exhaust port of the sizing equipment and the upstream side of the gripping portion to cause the force to act as a pulling force of the resin molding from the sizing flow channel and a pushing force of the resin molding to the gripping portion.

2. The manufacturing method according to claim 1, wherein the step of performing the axial bending process includes performing the axial bending process while keeping a part of the resin molding to be processed in a condition where a temperature of an inside is higher than a temperature on an outer surface of the resin molding.

3. The manufacturing method according to claim 2, wherein the keeping step includes keeping the part of the resin molding to be processed in a condition where the temperature on the outer surface is lower than a heat distortion temperature of the resin molding material composing the resin molding, and keeping the temperature of the inside of the part of the resin molding higher than or equal to the heat distortion temperature of the resin molding material and lower than the melting temperature.

4. The manufacturing method according to claim 1, wherein the step of performing the axial bending process includes performing a bending process for a part of the resin molding in the longitudinal direction of the axial line at a different radius of curvature from another part by changing the position of the gripping portion in accordance with a length of the resin molding passing through the gripping portion.

5. The manufacturing method according to claim 1, further comprising compulsorily cooling the resin molding from the outer surface with a coolant at least after a middle of the bending processing.

6. The manufacturing method according to claim 1, further comprising detecting an extrusion length of the resin molding, and cutting off the resin molding after the bending processing on a downstream side of the gripping portion, when the extrusion length reaches a predetermined length.

7. The manufacturing method according to claim 1, wherein the gripping portion performs at least two of the following operations, (a) changing the position in a first direction crossing the extrusion direction, (b) changing the position in a second direction crossing at a right angle to the first direction, and (c) changing the angle carriage.

8. The manufacturing method according to claim 1, further comprising:

performing an axial twisting process for the resin molding when the resin molding passes through the gripping portion by disposing the gripping portion in a carriage different from the constant angle carriage.

9. A method for manufacturing a long resin molding having an axial bend, comprising:

supplying a resin molding material in heated and molten state extruded from an extrusion die to a sizing flow channel of a sizing equipment;

solidifying the resin molding material by cooling from outside within the sizing flow channel to calibrate the resin molding into a predetermined cross sectional shape;

extruding the resin molding of the predetermined cross sectional shape from an exhaust port of the sizing flow channel at a constant extrusion direction and a constant angle carriage and in a state capable of plastic deformation;

supplying continuously the resin molding to a molding gripping portion of a bender disposed on a downstream side of an exhaust port of the sizing equipment along the constant extrusion direction, the gripping portion slidably gripping the resin molding; and controlling a degree of a radius of curvature of a bend in the resin molding in an axial bending process for the resin molding when the resin molding passes through the gripping portion by changing a position of the gripping portion to a position not along the constant extrusion direction, wherein the solidifying step includes cooling the resin molding material from an outer surface within the sizing flow channel so that the outer surface of the resin molding has a lower degree of crystallinity than the inside, and the resin molding material is a material containing crystalline resin as a main component.

10. A method for manufacturing a long molding having an axial bend along a longitudinal direction, comprising:

forming a long first member capable of plastic deformation continuously in the longitudinal direction, by employing a first member molding unit, the long first member having a predetermined cross sectional shape, and having a constant radius of curvature and a constant angle carriage on the axial line in the longitudinal direction;

supplying continuously the first member to a first member gripping portion of a bender disposed on the downstream side of the first member molding unit, the first member gripping portion slidably gripping the first member;

controlling a degree of a radius of curvature of a bend in the resin molding in an axial bending process for the first member, when the first member passes through the first member gripping portion, by changing a position of the first member gripping portion to a position not along the longitudinal direction;

causing the first member passing through the gripping portion to pass through an extrusion die provided near the gripping portion and at a position corresponding to an axial position passing through the gripping portion; and extruding a heated and molten liquid resin molding material for formation of a second member through an orifice of the extrusion die while following a bend of the first member to integrate the second member made of the molding material and having a predetermined cross sectional shape with the first member.

11. The manufacturing method according to claim 10, wherein the step of performing the axial bending process includes performing a bending process for a part of the first member passing through the gripping portion in the longitudinal direction at a different radius of curvature from another part by changing the position of the gripping portion or the extrusion die in accordance with a length of the first member passing through the gripping portion; and the extruding step includes integrating the second member extruded through the orifice with the first member along a longitudinal direction of the processed first member.

12. The manufacturing method according to claim 10, wherein the gripping portion performs at least two of the following operations, (a) changing the position in a first direction crossing the direction of supplying the first member, (b) changing the position in a second direction crossing at a right angle to the first direction, and (c) changing the angle carriage.

13. The manufacturing method according to claim 10, further comprising: detecting a supply length of the first member; and changing the position of the gripping portion or the extrusion die when the supply length reaches a predetermined length.

14. The manufacturing method according to claim 10, further comprising: compulsorily cooling and solidifying the second member after integrating the second member with the first member.

15. The manufacturing method according to claim 10, wherein the step of forming a long first member includes: roll forming a metallic strip material by the first member molding unit, and forming continuously the first member having the predetermined cross sectional shape in the longitudinal direction.

16. The manufacturing method according to claim 10, further comprising:

performing an axial twisting process for the first member, when the first member passes through the first member gripping portion, and the gripping portion is disposed at a carriage different from the constant angle carriage;

causing the first member passing through the gripping portion to pass through an extrusion die provided near the gripping portion and at a carriage corresponding to an angle carriage of the first member passing through the gripping portion; and extruding a heated and molten liquid resin molding material for formation of a second member through an orifice of the extrusion die while following a twist of the first member to integrate the second member made of the molding material and having a predetermined cross sectional shape with the first member.

17. A method for manufacturing a long molding having an axial bend along a longitudinal direction, comprising:

forming a long first member capable of plastic deformation continuously in the longitudinal direction, by employing a first member forming unit, the long first member having a predetermined cross sectional shape, and having a constant radius of curvature and a constant angle carriage on the axial line in the longitudinal direction;

controlling a degree of a radius of curvature of a bend in the resin molding in continuously the first member to a gripping portion of a bender disposed on the downstream side of the first member molding unit, the gripping portion slidably gripping the first member;

performing an axial bending process for the first member, when the first member passes through the gripping portion, by changing a position of the gripping portion to a position not along the longitudinal direction;

causing the first member passing through the gripping portion to pass through a second member extrusion die provided near the gripping portion and at a position corresponding to an axial position of the first member passing through the gripping portion; and extruding a heated and molten liquid resin molding material for formation of a second member through a second member molding opening of the second member extrusion die while following a bend of the first member to integrate the second member made of the molding material with the first member;

wherein the second member extrusion die has a substantially changeable opening shape of the second member molding opening; and the second member having a different cross sectional shape between a part and another part in the longitudinal direction is extruded in accordance with a change of the opening shape by changing the opening shape at a predetermined timing in extruding the second member.

18. The manufacturing method according to claim 17, wherein the opening shape of the second member molding opening is changed in accordance with the length of the first member passing through the gripping portion.

19. The manufacturing method according to claim 17, further comprising: detecting a supply length of the first member, and changing the position of the gripping portion or the extrusion die when the supply length reaches a predetermined length.

20. The manufacturing method according to claim 17, further comprising: detecting the supply length of the first member; and changing the opening shape of the second member molding opening when the supply length reaches a predetermined length.

21. The manufacturing method according to claim 17, further comprising: compulsorily cooling and solidifying the second member after integrating the second member with the first member.

22. The manufacturing method according to claim 17, further comprising:

performing an axial twisting process for the first member, when the first member passes through the gripping portion, and the gripping portion is disposed at a carriage different from the constant angle carriage;

causing the first member passing through the gripping portion to pass through a second member extrusion die provided near the gripping portion and at a carriage corresponding to an angle carriage of the first member passing through the gripping portion; and extruding a heated and molten liquid resin molding material for formation of a second member through a second member molding opening of the second member extrusion die while following a twist of the first member to integrate the second member made of the molding material with the first member;

wherein the second member extrusion die has a substantially changeable opening shape of the second member molding opening; and the second member having a different cross sectional shape between one part and the other part in the longitudinal direction is extruded in accordance with a change of the opening shape by changing the opening shape at a predetermined timing in extruding the second member.

* * * * *